United States Patent
Tokumaru et al.

(10) Patent No.: US 7,152,882 B2
(45) Date of Patent: Dec. 26, 2006

(54) MOBILE CARRIAGE

(75) Inventors: Tomoyoshi Tokumaru, Hirakata (JP);
Kazushige Kakutani, Hirakata (JP);
Atsushi Oda, Osaka (JP); Seiji Murakami, Osaka (JP); Naoto Tojo, Ikoma (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 63 days.

(21) Appl. No.: 10/397,195

(22) Filed: Mar. 27, 2003

(65) Prior Publication Data

US 2003/0184071 A1    Oct. 2, 2003

(30) Foreign Application Priority Data

Mar. 28, 2002 (JP) ............................. 2002-090686
Mar. 29, 2002 (JP) ............................. 2002-093457
Mar. 19, 2003 (JP) ............................. 2003-074741

(51) Int. Cl.
    *B60S 9/00*     (2006.01)
(52) U.S. Cl. ..................... 280/758; 180/8.2; 180/907
(58) Field of Classification Search ................ 280/758, 280/759, 755, 5.2, 304.1, DIG. 10, 250.1, 280/656; 180/8.1, 8.2, 8.3, 8.5, 8.6, 8.7, 180/907, 9.32, 24.02
    See application file for complete search history.

(56) References Cited

U.S. PATENT DOCUMENTS

| | | | | |
|---|---|---|---|---|
| 3,618,968 A | * | 11/1971 | Greer | ....................... 280/47.11 |
| 3,638,746 A | * | 2/1972 | Gostomski | ................... 180/210 |
| 3,640,192 A | * | 2/1972 | Mauldin | ..................... 404/122 |
| 3,653,269 A | * | 4/1972 | Foster | ......................... 74/84 S |
| 3,953,054 A | * | 4/1976 | Udden et al. | ............ 280/250.1 |
| 4,432,425 A | * | 2/1984 | Nitzberg | ..................... 180/8.2 |
| 4,484,648 A | * | 11/1984 | Jephcott | ..................... 180/210 |
| 4,566,707 A | * | 1/1986 | Nitzberg | ..................... 180/8.2 |
| 4,790,548 A | * | 12/1988 | Decelles et al. | ........... 280/5.26 |
| 4,794,999 A | * | 1/1989 | Hester | ........................ 180/8.2 |

(Continued)

OTHER PUBLICATIONS

Patent Unexamined Publication HEI 9-309469 * English Abstract.

(Continued)

*Primary Examiner*—Christopher P. Ellis
*Assistant Examiner*—Bridget Avery
(74) *Attorney, Agent, or Firm*—Armstrong, Kratz, Quintos, Hanson & Brooks, LLP

(57) ABSTRACT

The invention provides a mobile carriage which is adapted to shift the center of gravity efficiently by utilizing the weight of wheel rotating means, power source means and control means to thereby increase the weight of a weight portion and reduce the increase in the weight of the entire carriage, the carriage comprising a base frame, a front wheel and a rear wheel which are disposed under the base frame, wheel rotating means coupled to the front wheel and the rear wheel for rotatingly driving the wheels, power source means for the wheel rotating means, center-of-gravity shifting means having a weight portion disposed above the base frame and a mechanism for moving the weight portion relative to the base frame to shift the position of the center of gravity of the base frame by moving the weight portion by the moving mechanism, and control means for controlling the wheel rotating means and the moving mechanism, the carriage being characterized in that at least one of the wheel rotating means, the power source means and the control means is utilized as the weight portion of the center-of-gravity shifting means.

14 Claims, 25 Drawing Sheets

U.S. PATENT DOCUMENTS

| | | | | |
|---|---|---|---|---|
| 5,090,260 A | * | 2/1992 | Delroy | 74/537 |
| 5,350,033 A | * | 9/1994 | Kraft | 180/167 |
| 5,398,769 A | * | 3/1995 | Staples | 172/21 |
| 5,515,934 A | * | 5/1996 | Davis | 180/8.2 |
| 5,592,997 A | * | 1/1997 | Ball | 180/65.1 |
| 5,964,473 A | * | 10/1999 | Degonda et al. | 280/250.1 |
| 6,752,400 B1 | * | 6/2004 | Nakatsukasa et al. | 280/5.2 |

OTHER PUBLICATIONS

Patent Unexamined Publication HEI 1-317880 * English Abstract.
Patent Unexamined Publication HEI 7-40865 * English Abstract.
Patent Unexamined Publication 2000-62657 * English Abstract.
Utility Model Examined Publication SHO 48-15712 * partial translation.
Patent Examined Publication SHO 29-4156 * partial translation.
Patent Unexamined Publication SHO 63-203483 * English Abstract.

* cited by examiner

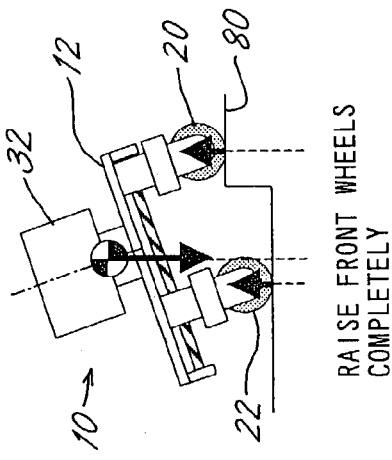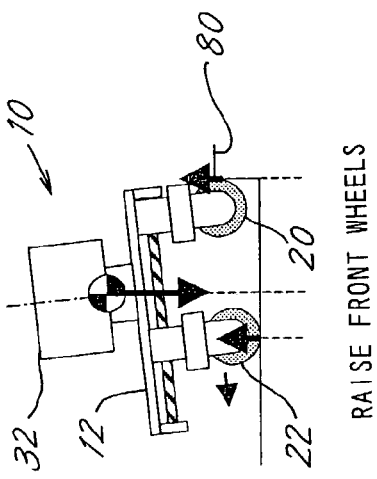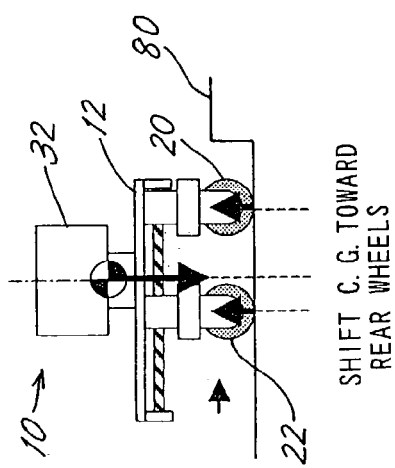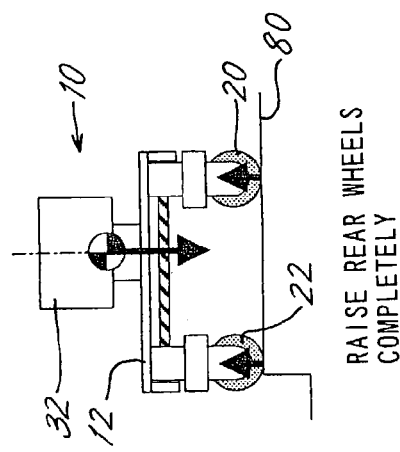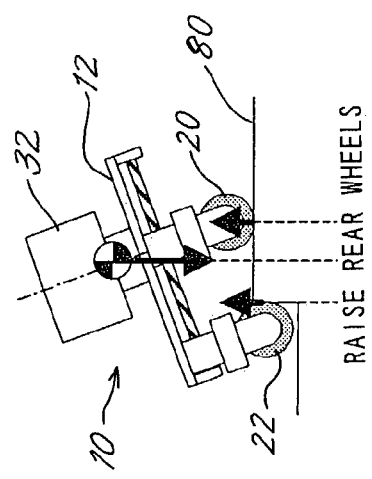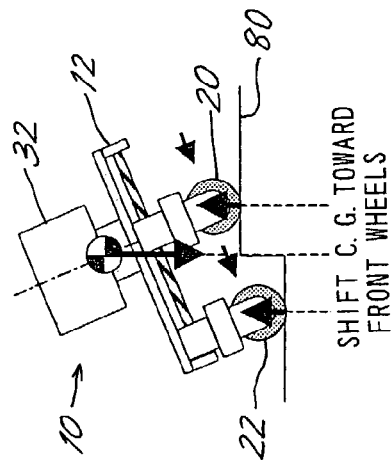

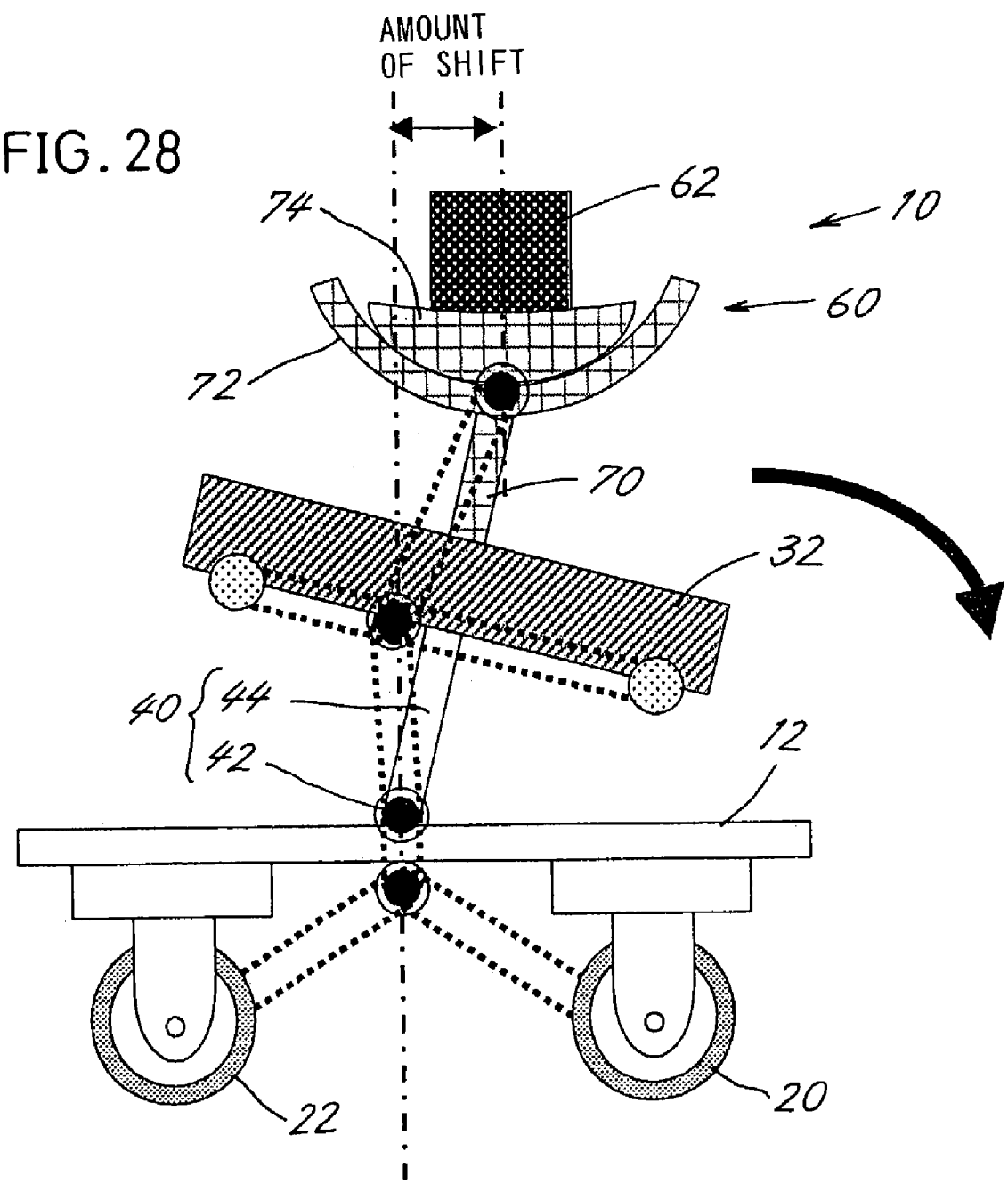

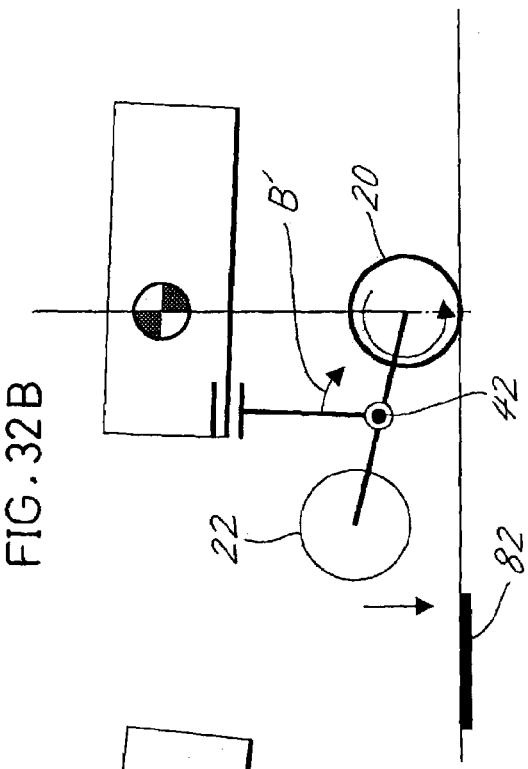
FIG. 32A
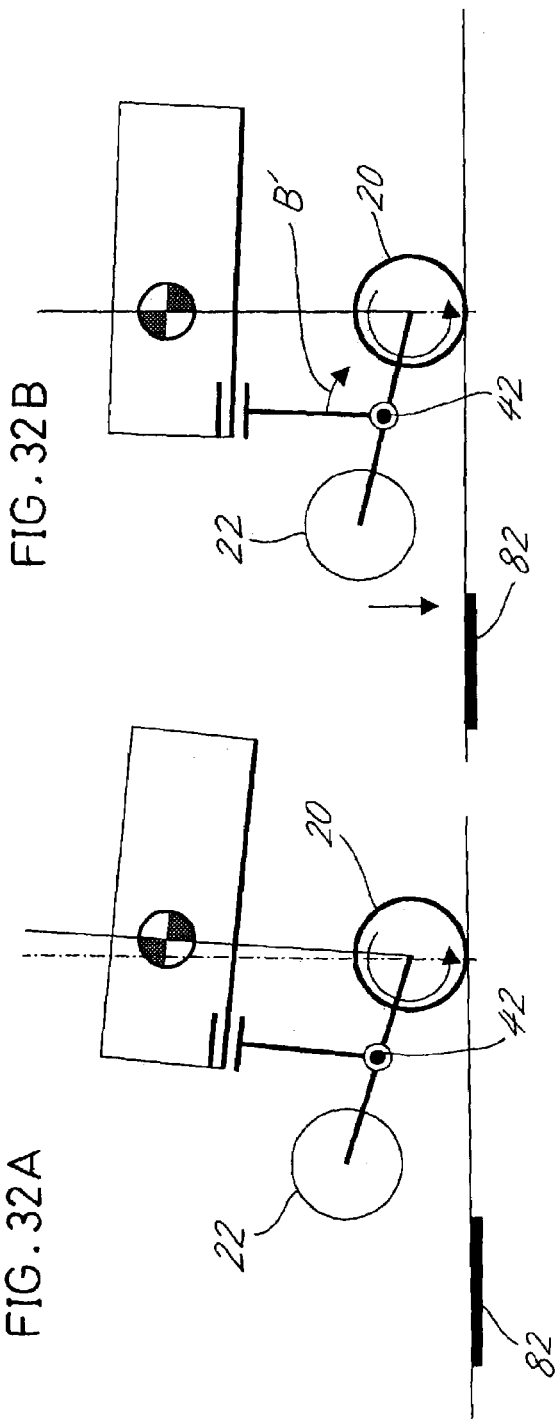
FIG. 32B
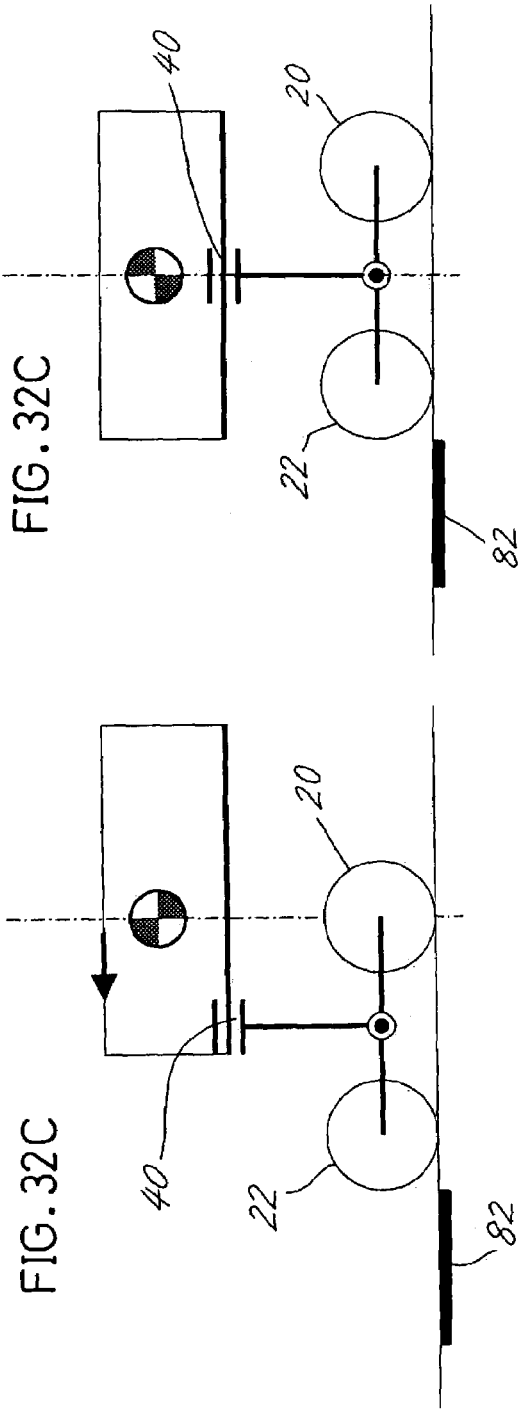
FIG. 32C
FIG. 32C

MOBILE CARRIAGE

FIELD OF THE INVENTION

The present invention relates to self-propelled mobile carriages adapted to move over differences in level or the like with good stability.

BACKGROUND OF THE INVENTION AND PROBLEMS TO BE SOLVED

FIG. 37 shows a self-propelled mobile carriage 90 which is adapted to move over differences in level such as steps and which is provided with means 92 for adjusting the position of the center of gravity of the carriage by moving a weight portion 91. The center-of-gravity shifting means 92 enables the carriage 90 to move over a difference in level greater than one-half the diameter of its wheels, further preventing the carriage from falling down while moving over the level difference.

For the carriage to move over a greater difference in level, the center of gravity of the carriage must be shifted toward the opposite side to the wheels which are to be moved up to the higher level, namely toward the rear wheels if the front wheels are to be moved up to the higher level, or toward the front wheels if the rear wheels are to be moved up to the higher level.

Stated more specifically with reference to FIG. 37, when the rear wheels 94 are to be moved up onto a step 80 subsequently after the front wheels 93 are brought up onto the step 80, the center of gravity needs to be shifted toward the front wheels. However, even if the weight portion 91 is shifted forward, the carriage as moved up onto the step 80 is inclined rearward in its entirety, with the result that the position of the center of gravity of the entire carriage as projected immediately therebelow is located at a rear portion of a phantom line interconnecting the positions of the center of the front wheel and the center of the rear wheel as projected immediately therebelow as shown in FIG. 37. Thus, the rear wheels 94 are unable to move up onto the step 80 due to the gravity acting on the rear wheels 94.

In order to effectively shift the center of gravity, there is a need to increase the weight proportion of the weight portion 91 to the carriage 90, but this entails the problem of increasing in the weight of the carriage 90.

Further if the carriage advances onto a higher level in an oblique direction, one wheel is likely to rise or float in the air, failing to come into contact with the ground and bringing the carriage out of proper balance. Thus the carriage is unable to move over the difference in level or to run along with good stability.

SUMMARY OF THE INVENTION

An object of the present invention is to provide a carriage which is adapted to shift the center of gravity thereof efficiently and which is capable of moving over differences in level or like obstacles with good stability.

The present invention provides a mobile carriage comprising a base frame, a front wheel and a rear wheel which are disposed under the base frame, wheel rotating means coupled to the front wheel and the rear wheel for rotatingly driving the wheels, power source means for the wheel rotating means, center-of-gravity shifting means having a weight portion disposed above the base frame and a mechanism for moving the weight portion relative to the base frame to shift the position of the center of gravity of the base frame by moving the weight portion by the moving mechanism, and control means for controlling the wheel rotating means and the moving mechanism, the mobile carriage being characterized in that at least one of the wheel rotating means, the power source means and the control means is utilized as the weight portion of the center-of-gravity shifting means.

At least one of the wheel rotating means, the power source means and the control means which are mounted on the carriage is disposed in the weight portion of the center-of-gravity shifting means to utilize the means as the weight of the weight portion, whereby the weight portion can be given increased weight while reducing the increase in the weight of the carriage.

The center of gravity of the carriage can then be shifted efficiently by moving the weight portion.

The present invention further provides a mobile carriage wherein a carriage base frame provided with a plurality of wheels has center-of-gravity shifting means for shifting the center of gravity of the base frame, the carriage comprising a pair of wheel support portions pivotally movably arranged at opposite lateral sides of the base frame, pivotal drive means for pivotally moving each of the wheel support portions relative to the base frame, a pair of wheels arranged respectively in front of and in the rear of each of the wheel support portions, and wheel rotating means for rotatingly driving each of the wheels. When the carriage is to be moved over a difference in level, the pivotal drive means is operated to pivotally move one of the wheel support portions and raise the wheel disposed in front of said one wheel support portion.

When the wheel rotating means for the wheels are driven, the carriage is advanced. While the carriage is running on a flat road, the center-of-gravity shifting means is so controlled as to position the center of gravity approximately at the center of the base frame.

If there is a difference in level or a step in the direction toward which the carriage is to be advanced, one or both of the wheels (front wheels) toward the front of the base frame come into contact with the step.

Upon detecting the contact of the front wheel or wheels with the step, the center-of-gravity shifting means is operated to shift the center of gravity of the carriage rearward.

In this state, the pivotal drive means for the front wheel in contact with the step (i.e., one of the front wheels when both the front wheels are in contact with the step) is operated to pivotally move the wheel support means for supporting the front wheel in contact with the step and raise the front wheel.

When the carriage is advanced with the front wheel raised, the raised front wheel is moved up over the step. In this state, the pivotal drive means is operated reversely to bring the front wheel moved up over the step down onto the step.

When the carriage is further advanced, the other front wheel is brought into contact with the step. The pivotal drive means for the front wheel brought into contact with the step is operated in this state to pivotally move the corresponding wheel support means and raise the front wheel in the same manner as above, and the carriage is advanced.

When the front wheel is moved up over the step, the pivotal drive means is operated reversely to bring the front wheel down onto the step.

In this way, both the front wheels are moved up onto the step. The center-of-gravity shifting means is operated in this state to shift the center of gravity of the carriage forward.

The carriage is further advanced to thereby cause both the rear wheels to move up onto the step and move over the level difference.

After the carriage is moved up onto the step, the center-of-gravity shifting means is operated to return the center of gravity of the carriage approximately to the position at the center.

In this way, the carriage is adapted to move up onto the step.

The pivotal movement of the wheel support means balances the carriage like a balance device due to the presence of the front and rear wheels, so that the pivotal movement of the wheel support means does not require a large amount of energy to ensure savings in energy and quick behavior.

BRIEF DESCRIPTION OF THE DRAWINGS

FIGS. 24A to 24F are side elevations showing the process for causing the mobile carriage of Embodiment 5 to move up onto a step;

FIG. 28 is a side elevation of another mobile carriage of Embodiment 6;

FIGS. 32A to 32D are diagrams for illustrating the process for causing the mobile carriage of Embodiment 7 to move over the ditch;

DETAILED DESCRIPTION OF THE PREFERRED EMBODIMENTS

<Embodiment 1>

Figure 1:
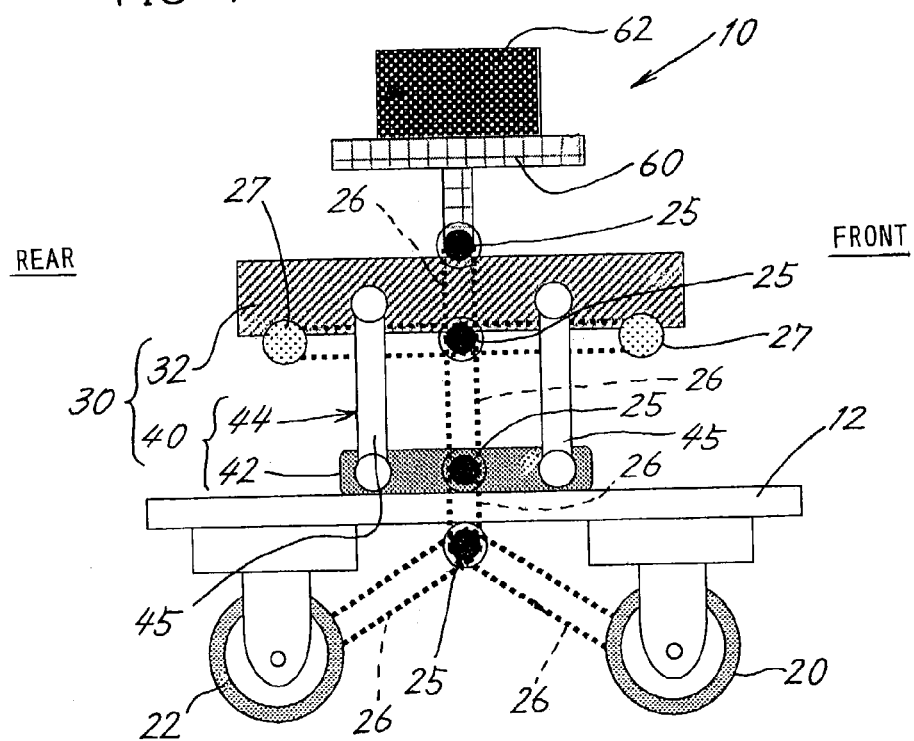
FIG. 1 is a side elevation of a mobile carriage of Embodiment 1.

FIG. 1 is a side elevation of a mobile carriage 10 of the present invention.

As illustrated, the mobile carriage 10 comprises front wheels 20 and rear wheels 22 arranged under a base frame 12 for causing the carriage 10 to run, and is provided with center-of-gravity shifting means 30 on the upper surface of the base frame 12 for adjusting the position of the center of gravity of the carriage 10 and a table 60 above the base frame 12 for placing thereon an article 62 to be carried.

The wheels 20, 22 are arranged below the base frame 12. Although the illustrated embodiment has four wheels, the number of wheels is not limited to four.

The wheels 20, 22 have rotary axles which are coupled to wheel rotating means 24 to be described later by gears 25 and belts 26. Preferably, the belts 26 are made from a stretchable material.

The center-of-gravity shifting means 30 is mounted on the upper surface of the base frame 12. The center-of-gravity shifting means 30 comprises a weight portion 32, and a moving mechanism assembly 40 for moving the weight portion 32 relative to the base frame 12.

The moving mechanism assembly 40 comprises a rotating mechanism 42 for supporting the weight portion 32 rotatably in a horizontal plane relative to the base frame 12, and a translating mechanism 44 for reciprocatingly moving the weight portion 32 in horizontal directions relative to the rotating mechanism 42.

The rotating mechanism 42 comprises a mechanism rotatable in a horizontal plane relative to the base frame 12 and is coupled to a motor 27 by a belt (not shown).

The translating mechanism 44 comprises a pair of parallel links 45, 45 each having one end connected to the rotating mechanism 42 and the other end connected to the weight portion 32. Each of the parallel links 45, 45 has an upper end providing a gear (not shown) coupled via speed reduction means to a motor 27 mounted on the base frame 32.

The weight portion 32 is supported by the parallel links 45, 45 of the translating mechanism 44, and the table 60 is supported by an upper portion of the weight portion 32. The table 60 is made pivotally movable relative to the weight portion 32 by a gear 25 and a belt 26.

The weight portion 32 includes the motors 27, 27 serving as power sources for the wheel rotating means 24, 24 for the wheels 20, 22, the rotating mechanism 42 and the translating mechanism 44, and a motor 27 for pivotally moving the table 60. Other means, such as control means for the carriage 10 and a battery or like power source means, can be included in the weight portion 32 when the power source means is to be mounted on the carriage 10.

As stated above, the table 60 is pivotally movably supported by the weight portion 32 and is adapted to carry thereon a baggage or load, camera and like articles 62 to be carried. The weight of the table 60 and the articles 62 is utilized also as the weight portion 32.

Figure 2:
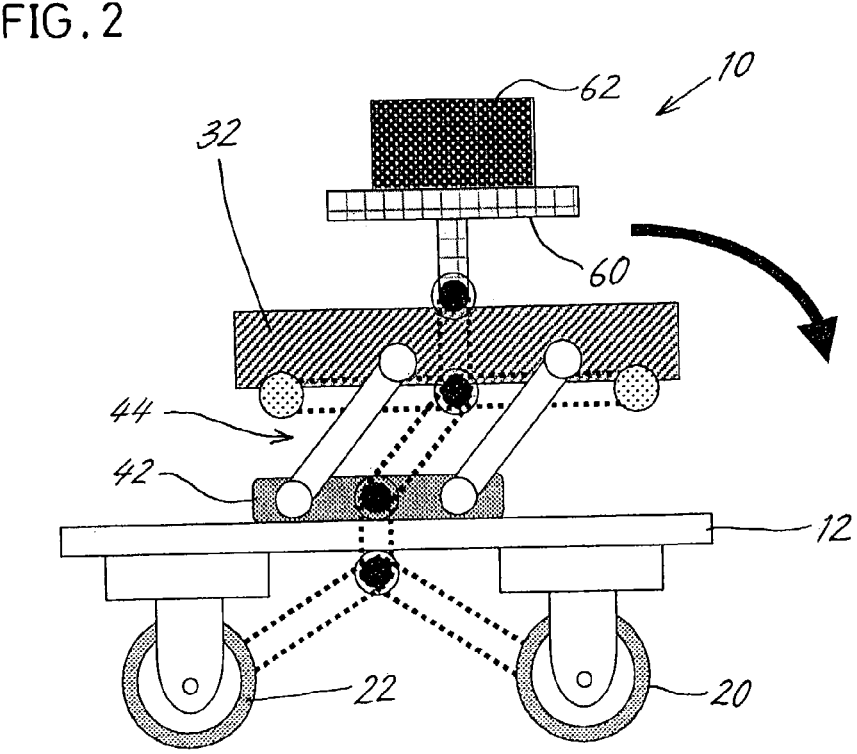
FIG. 2 is a side elevation of the mobile carriage of Embodiment 1 with a weight portion moved forward or rearward.
Figure 3:
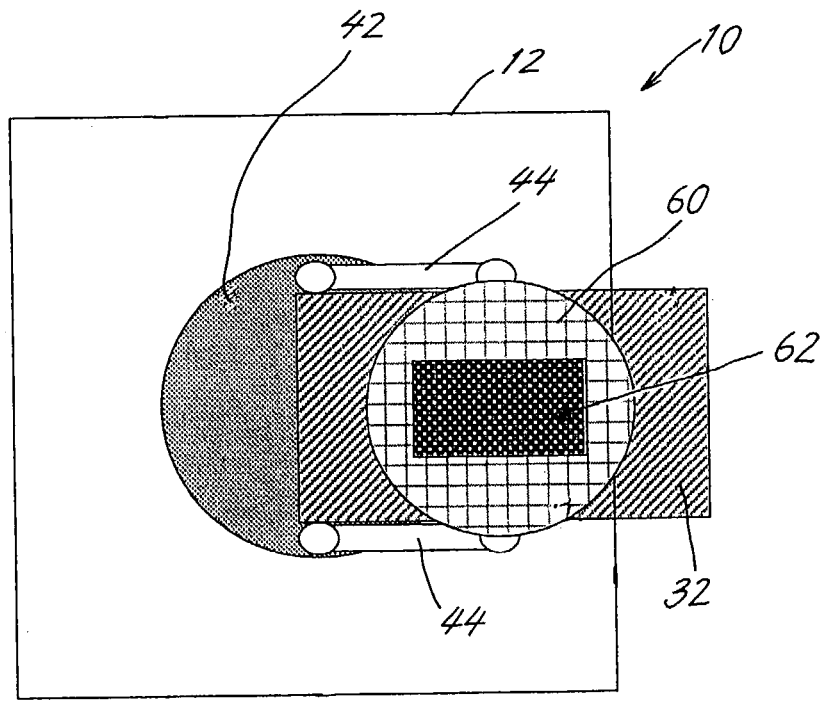
FIG. 3 is a plan view of FIG. 2.

When the translating mechanism 44 of the mobile carriage 10 thus constructed is operated, the weight portion 32 moves forward or rearward relative to the base frame 12 as shown in FIGS. 2 and 3, shifting the center of gravity of the base frame 12 forward or rearward.

Figure 4:
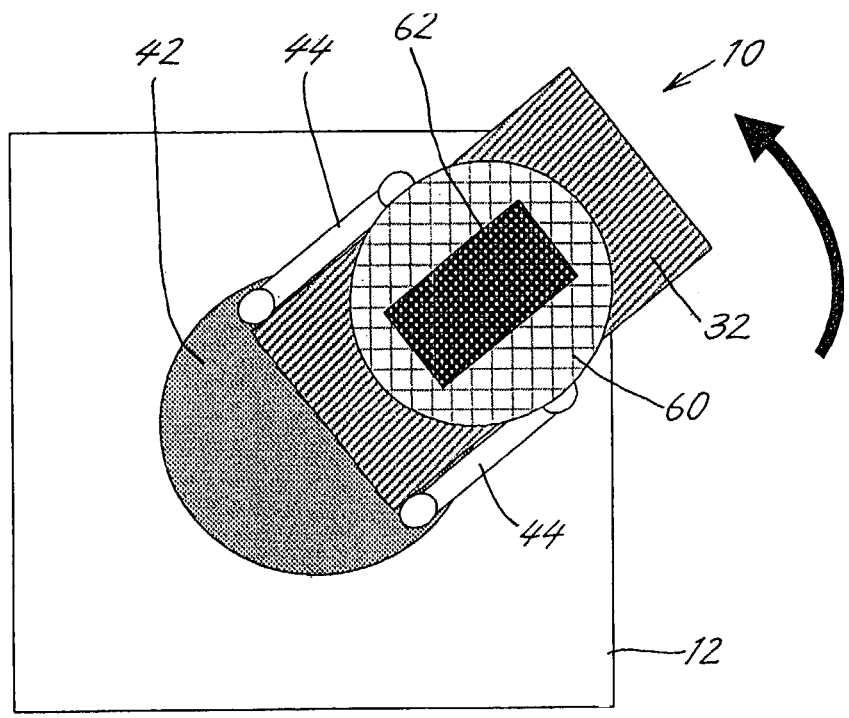
FIG. 4 is a plan view of the mobile carriage of Embodiment 1 with the weight portion moved leftward or rightward.

Further when the rotating mechanism 42 is operated with the weight portion 32 moved forward or rearward, the weight portion 32 can be moved leftward or rightward relative to the base frame 12 as shown in FIG. 4, shifting the center of gravity of the base frame 12 leftward or rightward.

Figure 5:
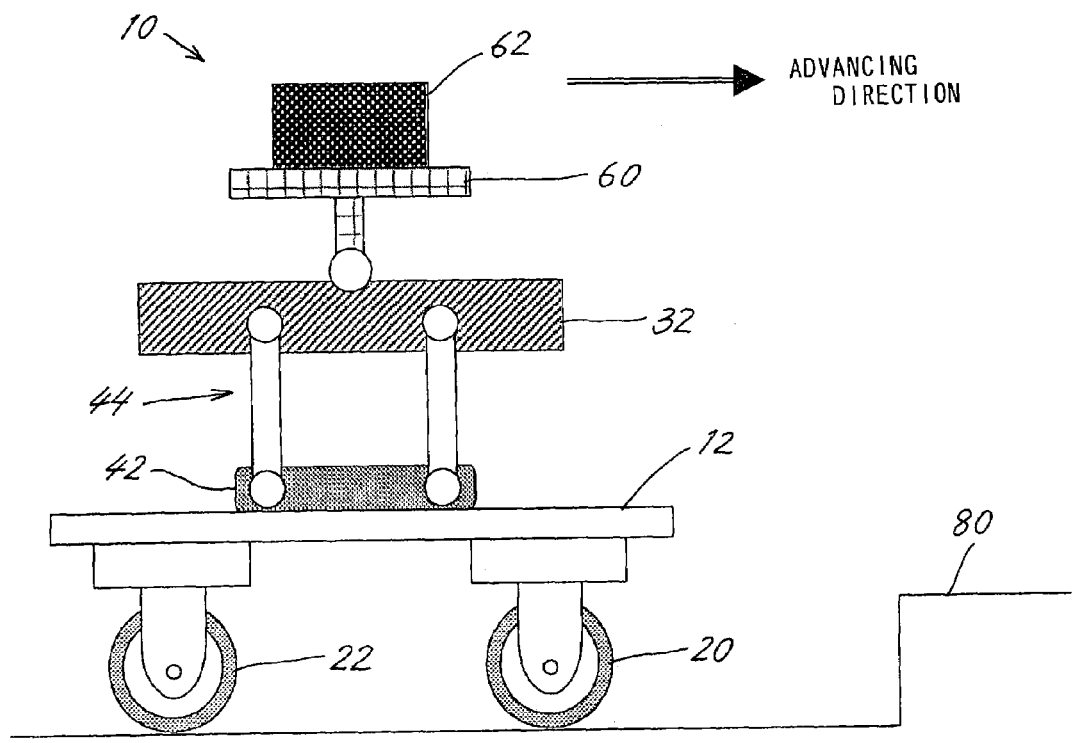
FIG. 5 is a side elevation showing a process for causing the mobile carriage of Embodiment 1 to move over a difference in level, i.e., onto a step.
Figure 6:
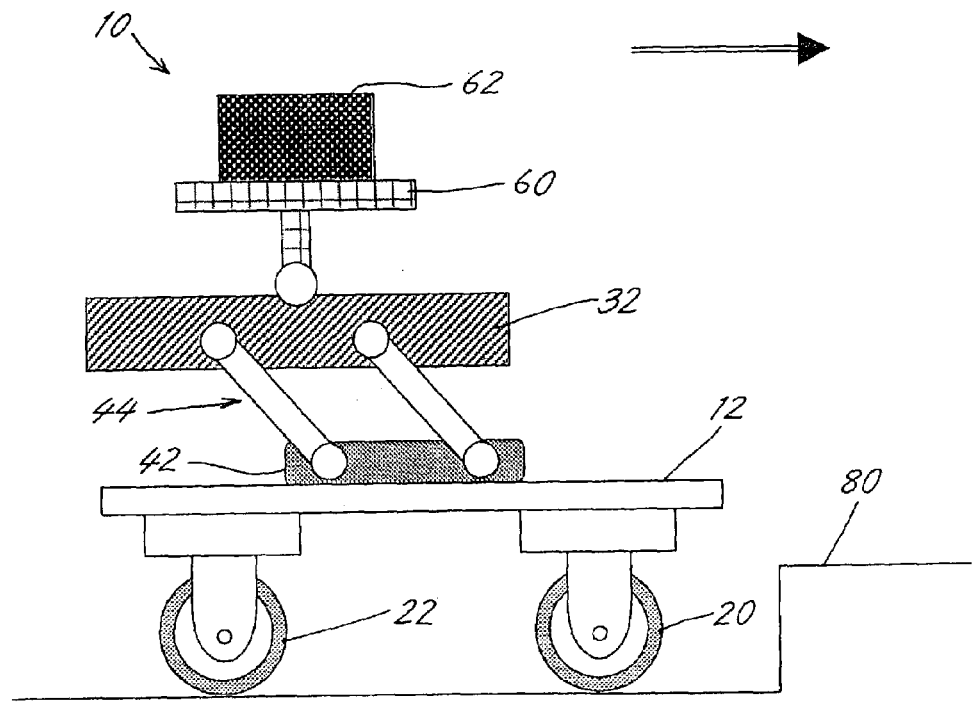
FIG. 6 is a side elevation showing the process for causing the mobile carriage of Embodiment 1 to move up onto the step.
Figure 7:
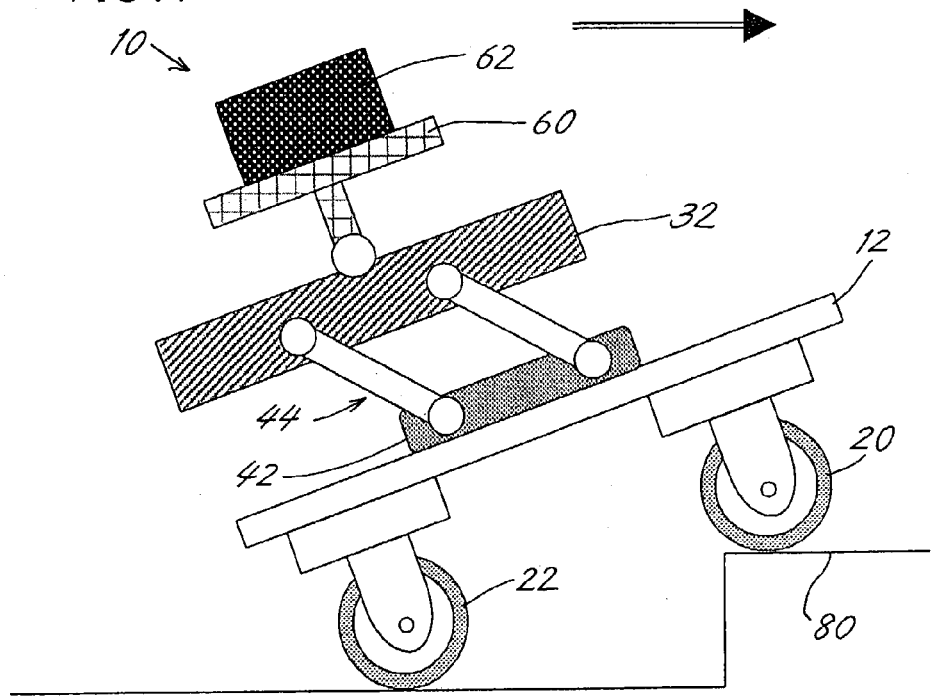
FIG. 7 is a side elevation showing the process for causing the mobile carriage of Embodiment 1 to move up onto the step.

When the carriage 10 is to be moved up over a difference in level, i.e., onto a step 80, the translating mechanism 44 is operated from the state of FIG. 5 to move the weight portion 32 rearwardly of the base frame 12 as seen in FIG. 6. Consequently, the weight of the carriage 10 almost entirely fails to act on the front wheels 20 of the base frame 20 closer to the stepped portion 80, with the result that the front wheels 20 are moved up onto the step 80 as shown in FIG. 7 by the thrust of the rear wheels 22 and the force of friction between the step 80 and the front wheels 20.

Figure 8:
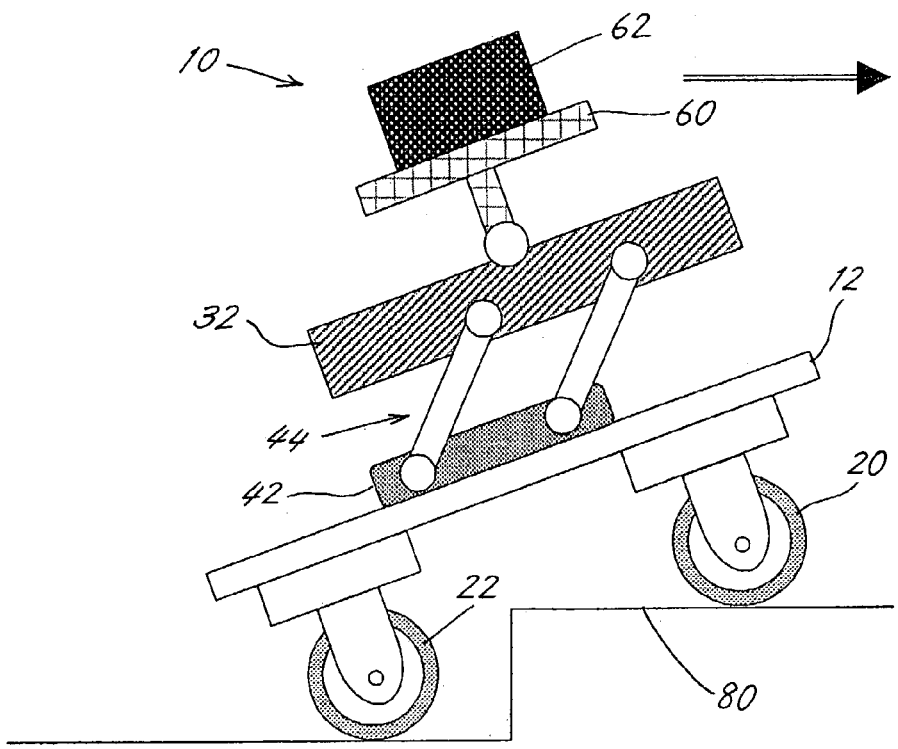
FIG. 8 is a side elevation showing the process for causing the mobile carriage of Embodiment 1 to move up onto the step.

The translating mechanism 44 is operated after the front wheels 20 have been moved up onto the step 80 to move the weight portion 32 toward the front of the base frame 12 as shown in FIG. 8. Consequently, almost no weight of the carriage 10 acts on the rear wheels 22, so that the rear wheels 22 are moved up onto the step 80 by the thrust of the front wheels 20 and the force of friction between the step and the rear wheels 22.

Figure 9:
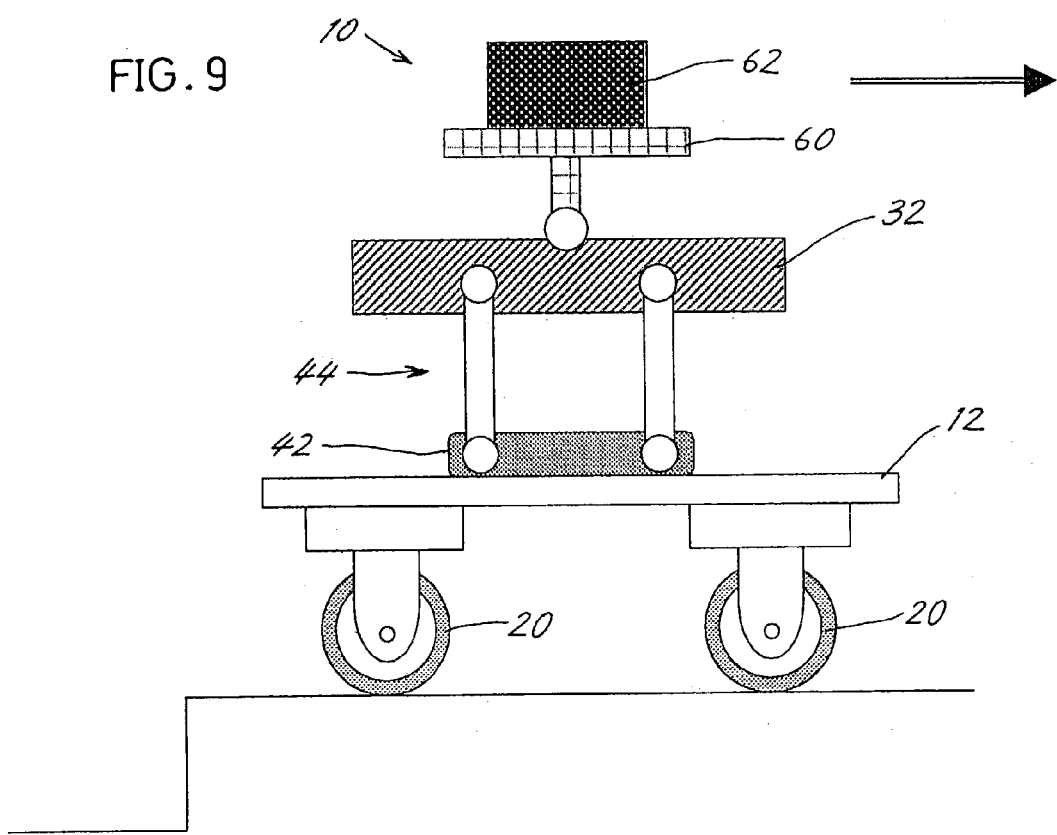
FIG. 9 is a side elevation showing the process for causing the mobile carriage of Embodiment 1 to move up onto the step.

After the carriage 10 has been moved up onto the step 80, the weight portion 32 is so moved that the center of gravity is positioned approximately at the center of the base frame 12 as shown in FIG. 9.

When the carriage is to be caused to run on an inclined road surface, the weight portion 32 is moved in accordance with the inclination of the road and with the direction toward which the slope faces. Stated more specifically, the center of gravity is shifted toward the wheel which is positioned on the higher side of the slope.

Figure 10:
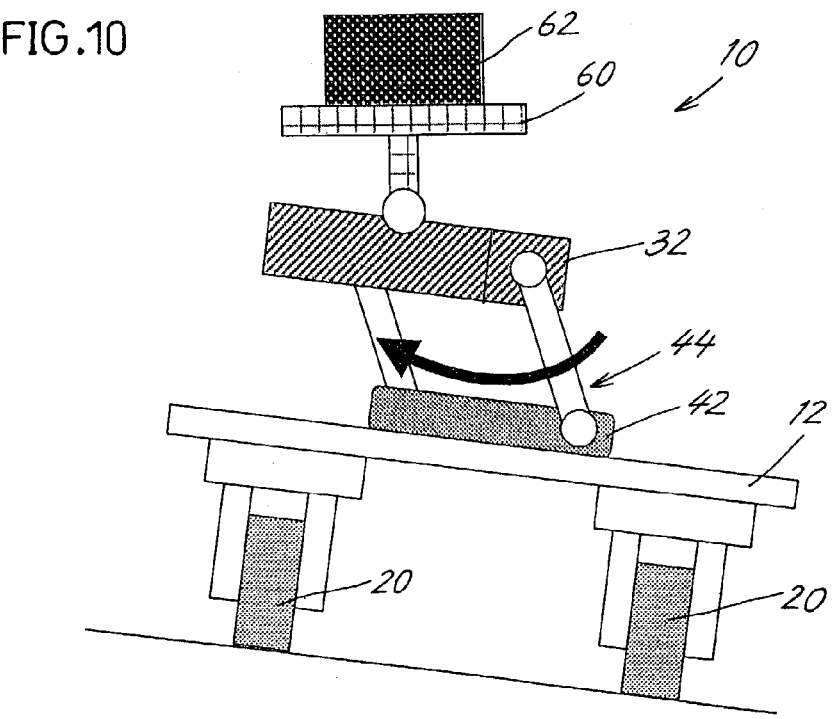
FIG. 10 is a front view showing the mobile carriage of Embodiment 1 in travel on a slope.

When the carriage 10 is to be caused to run along a slope inclined transversely of the direction of advance of the carriage 10, for example, as shown in FIG. 10, the weight portion 32 is moved toward the side of higher level (toward the left in the drawing). The weight portion 32 can be moved leftward or rightward by operating the translating mechanism 44 and the rotating mechanism 42 as previously stated. The amount of shift of the center of gravity is suitably determined in accordance with the inclination.

<Embodiment 2>

This embodiment is the same as Embodiment 1 except that Embodiment 2 includes a different moving mechanism assembly 40 in the weight portion 32.

Figure 11:
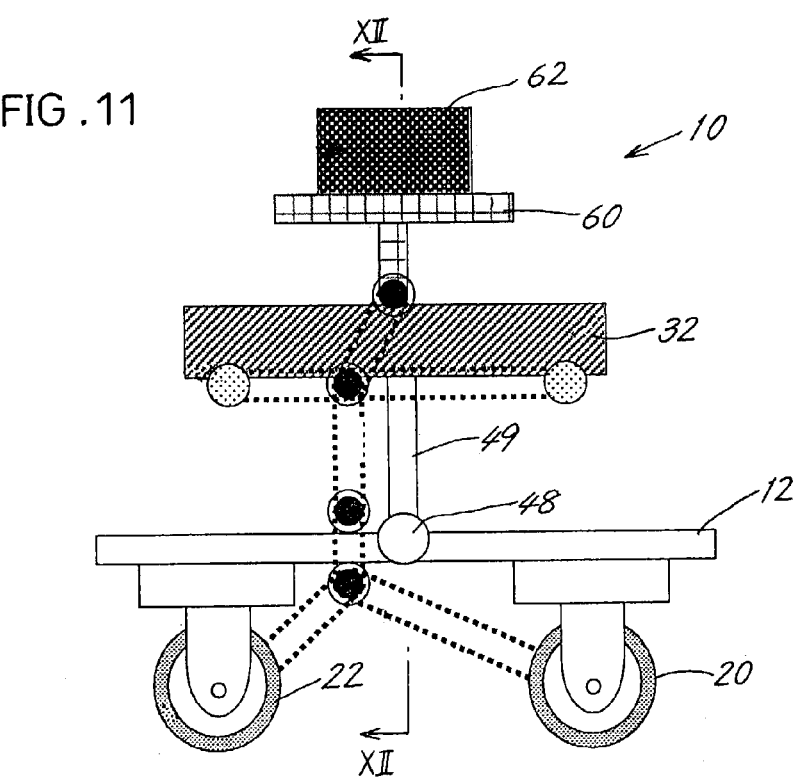
FIG. 11 is a side elevation of a mobile carriage of Embodiment 2.
Figure 12:
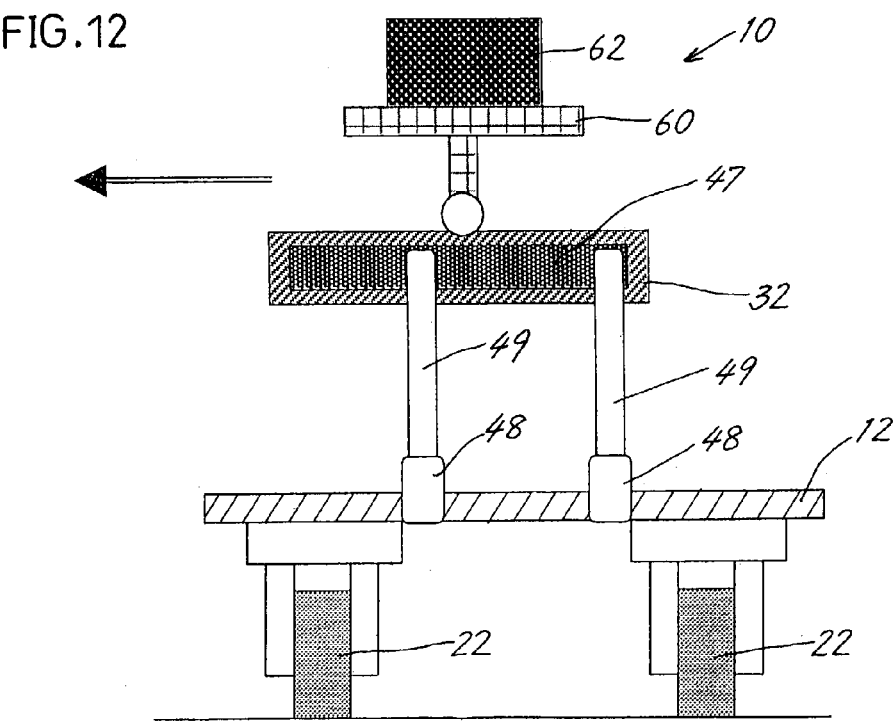
FIG. 12 is a view in section taken along the line XII—XII in FIG. 11.

With reference to FIGS. 11 and 12, the moving mechanism assembly 40 comprises a pair of rods 49, 49 for connecting the weight portion 32 to the base frame 12. The rods 49, 49 are connected to the weight portion 32 by a slide mechanism 47 so as to be slidable leftward or rightward relative to the weight portion 32. Each of the rods 49 is connected at its lower end to the base frame 12 by means of a pivot mechanism 48 which is made pivotally movable by a gear (not shown) and belt (not shown). The belt of the pivot mechanism 48 is driven by a motor (not shown) provided on the weight portion 32.

Figure 13:
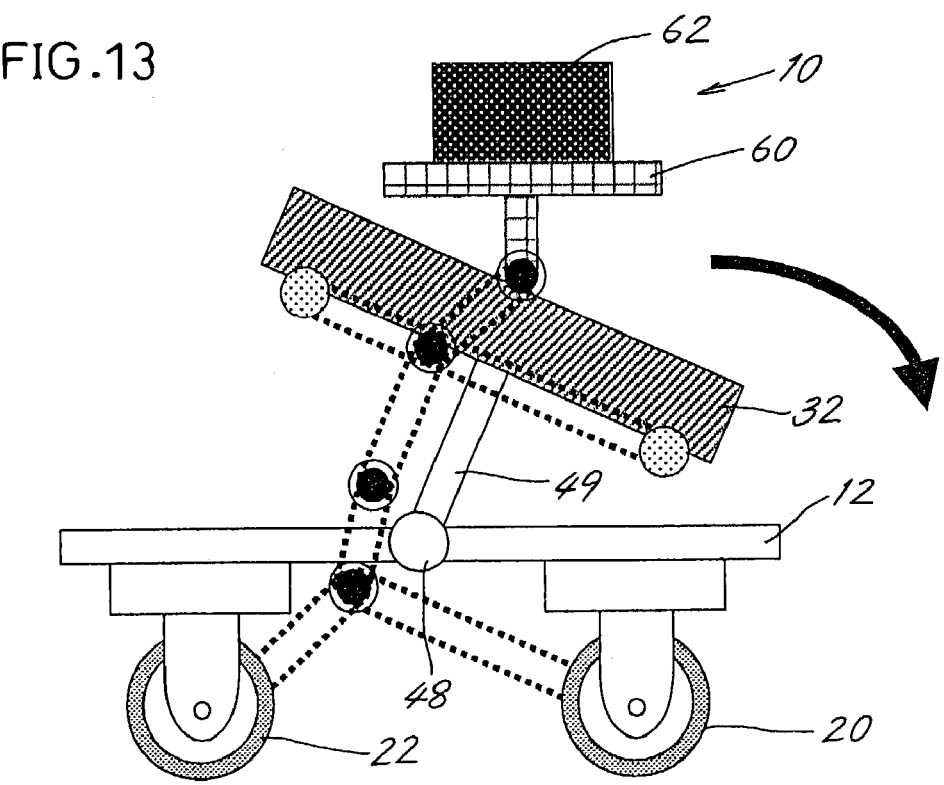
FIG. 13 is a side elevation of the mobile carriage of Embodiment 2 with a weight portion moved forward or rearward.

When the slide mechanism 47 is operated, the weight portion 32 is slidingly moved leftward or rightward relative to the base frame 12 as shown in FIG. 12 to shift the center of gravity of the base frame 12 leftward or rearward. When the pivot mechanisms 48 are operated, the weight portion 32 can be translated forward or rearward as shown in FIG. 13, whereby the center of gravity of the base frame 12 can be shifted. At this time, the table 60 is preferably so controlled as to be held in a horizontal position.

<Embodiment 3>

This embodiment utilizes the inertial force to be produced by the movement of the weight portion 32 for causing the carriage to move up onto a step 80.

With respect to Embodiment 1 and 3, like parts will not be described again.

Figure 14:
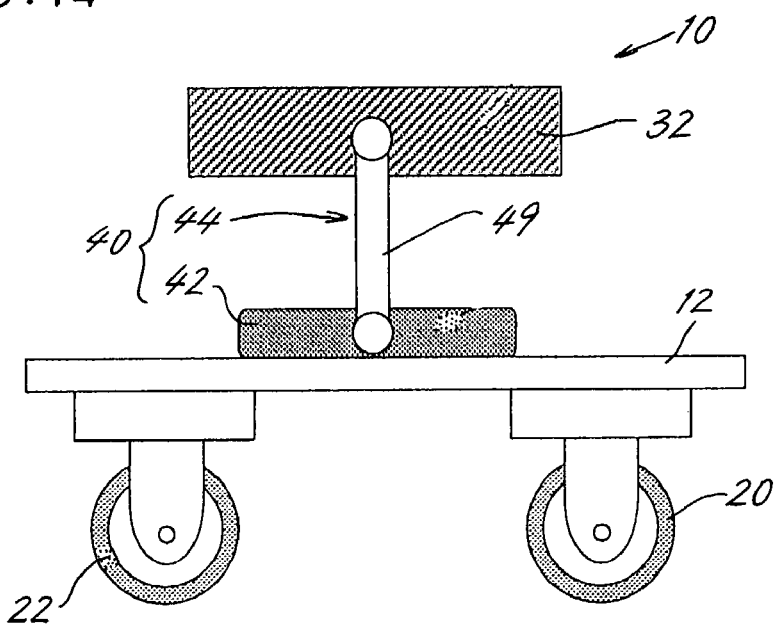
FIG. 14 is a side elevation of a mobile carriage of Embodiment 3.

FIG. 14 shows a mobile carriage 10 which has four wheels 20, 22 under a base frame 12. Mounted on the upper side of the base frame is a moving mechanism assembly 40 of a weight portion 32. The moving mechanism assembly 40 comprises a rotating mechanism 42 and a translating mechanism 44. The rotating mechanism 42 has the same construction as in Embodiment 1. The translating mechanism 44 comprises rods 49 in place of the parallel links 45, 45 of Embodiment 1. The rods 49 have opposite ends pivotably supported by the weight portion 32 and the rotating mechanism 42 by means of belts (not shown) and gears (not shown).

The wheels 20, 22 and the mechanisms are coupled by belts, gears or the like to motors (not shown) arranged on the weight portion 32 and are thereby made drivable.

Figure 15:
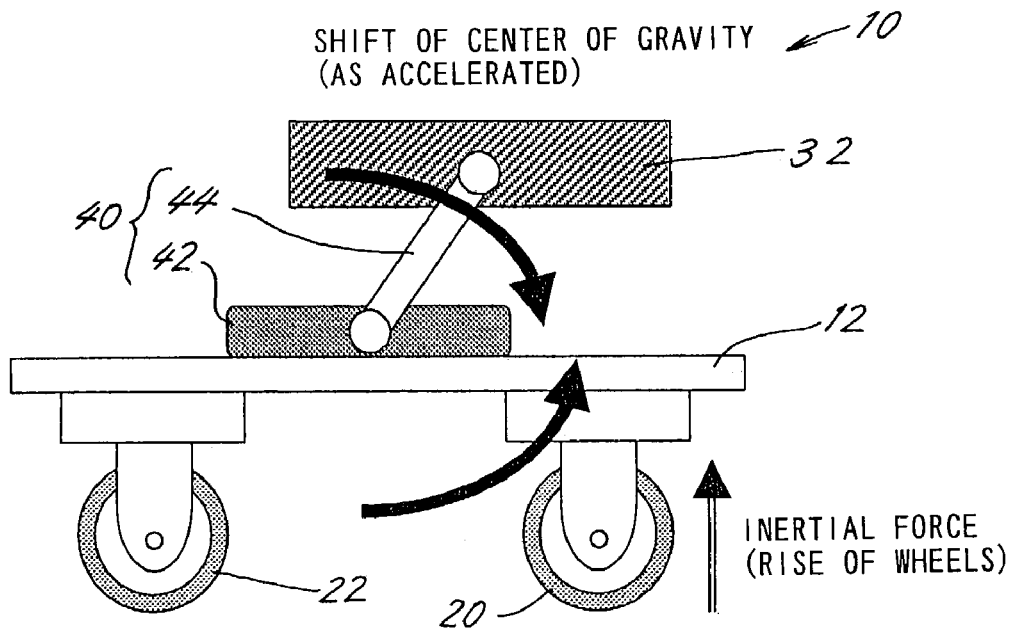
FIG. 15 is a side elevation of the mobile carriage of Embodiment 3 with a weight portion thereof rotated forward at an accelerated rate.

When the mobile carriage 10 is to be moved up onto a step 80, the translating mechanism 44 is operated in the state of FIG. 14 to move or rotate the weight portion 32 toward the front of the base frame 12 at an accelerated rate as shown in FIG. 15. When the weight portion 32 is thus forwardly moved or rotated while being accelerated, the dynamic shift of the center of gravity of the base frame 12 produces an inertial force, which acts on the base frame 12 as torque of opposite direction to the direction of movement of the weight portion 32, consequently reducing the weight loaded on the front wheels 20 and making the front wheels liftable.

Incidentally even when the weight portion 32 is rearwardly moved or rotated at a decelerated rate, an inertial force acts in a direction to raise the front wheels 20.

Figure 16:
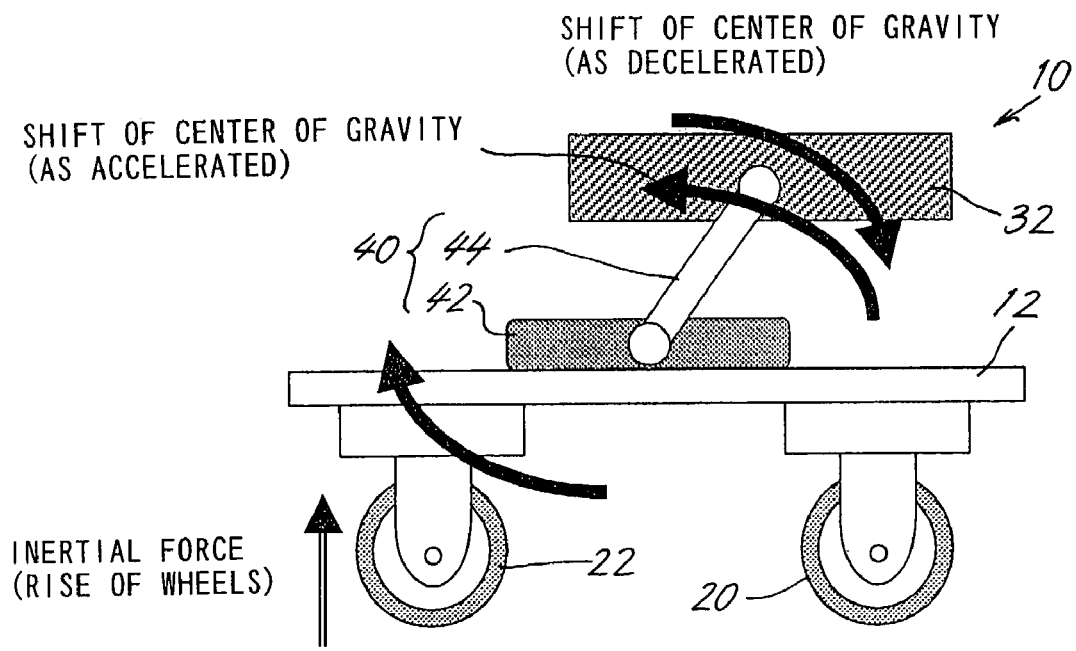
FIG. 16 is a side elevation of the mobile carriage of Embodiment 3 with the weight portion thereof rotated rearward at an accelerated rate or rotated forward at a decelerated rate.

Conversely an inertial force acts in a direction to raise the rear wheels 22 as shown in FIG. 16 if the weight portion 32 is forwardly moved or rotated at a decelerated rate or rearwardly moved or rotated at an accelerated rate.

Thus, the wheels 20, 22 can be raised by rotating or moving the weight portion 32 at an accelerated or decelerated rate.

The mobile carriage 10 of Embodiment 3 is caused to move up onto the step 80 by the process to be described below.

Figure 17:
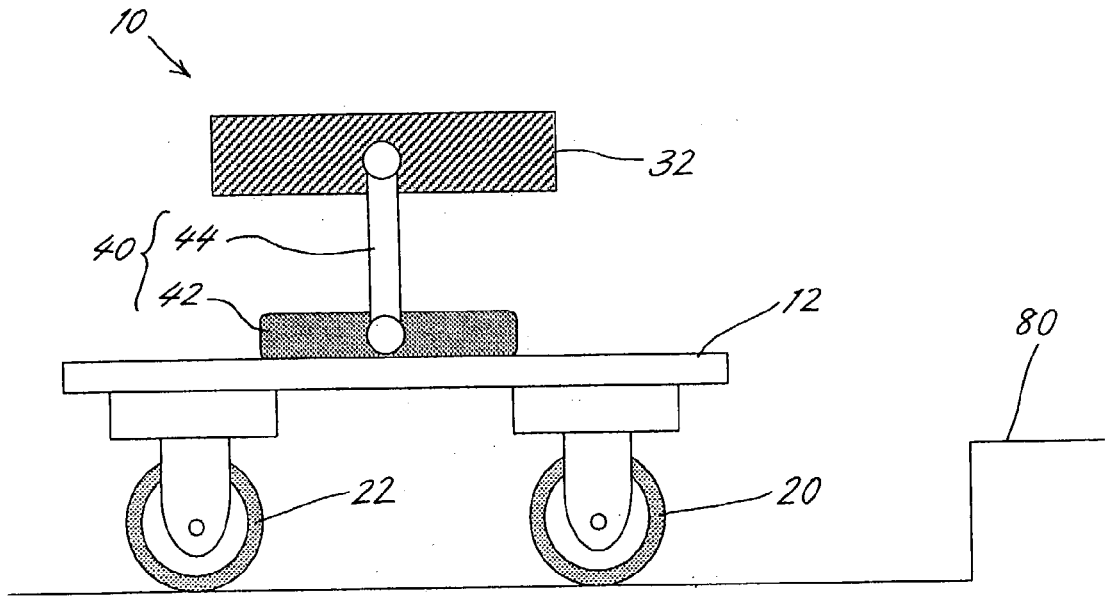
FIG. 17 is a side elevation showing a process for causing the mobile carriage of Embodiment 3 to move over a difference in level, i.e., onto a step.
Figure 18:
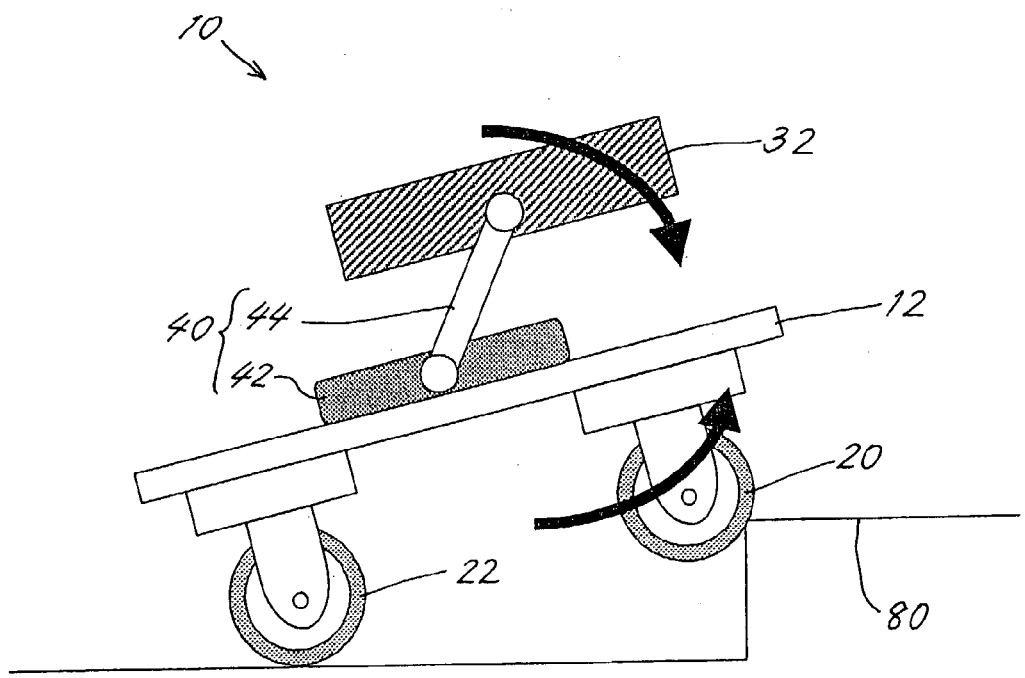
FIG. 18 is a side elevation showing the process for causing the mobile carriage of Embodiment 3 to move up onto the step.
Figure 19:
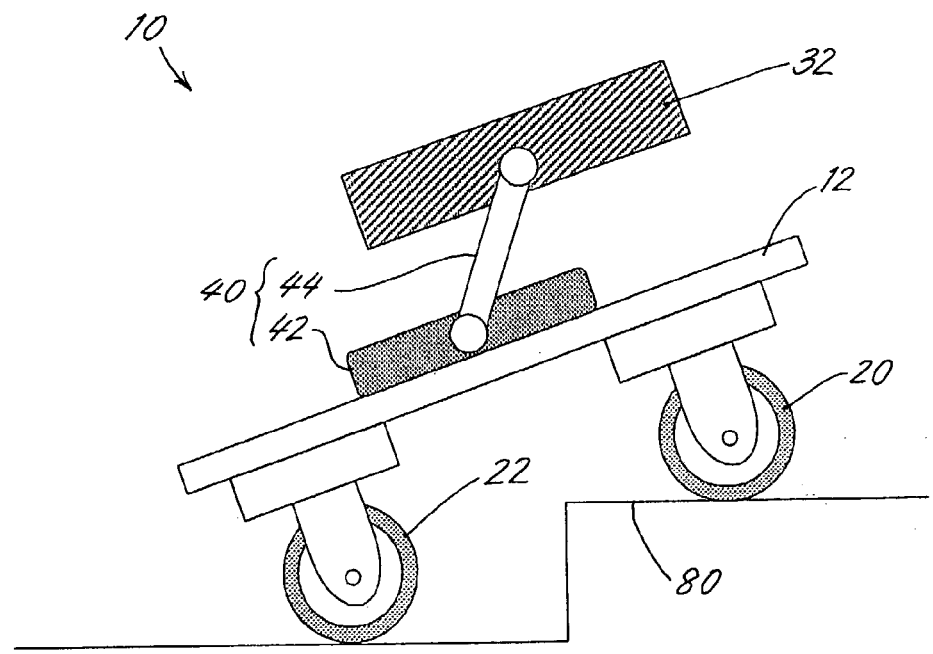
FIG. 19 is a side elevation showing the process for causing the mobile carriage of Embodiment 3 to move up onto the step.

When the front wheels 20 approach the step 80 while the carriage 10 is in travel in the state of FIG. 17, the translating mechanism 44 is operated to move or rotate the weight portion 32 forward at an accelerated rate as shown in FIG. 18. This reduces the weight acting on the front wheels 20, and the front wheels 20 are moved up onto the step 80 as shown in FIG. 19 by the thrust of the rear wheels 22 and the force of friction between the step 80 and the front wheels 20.

Figure 20:
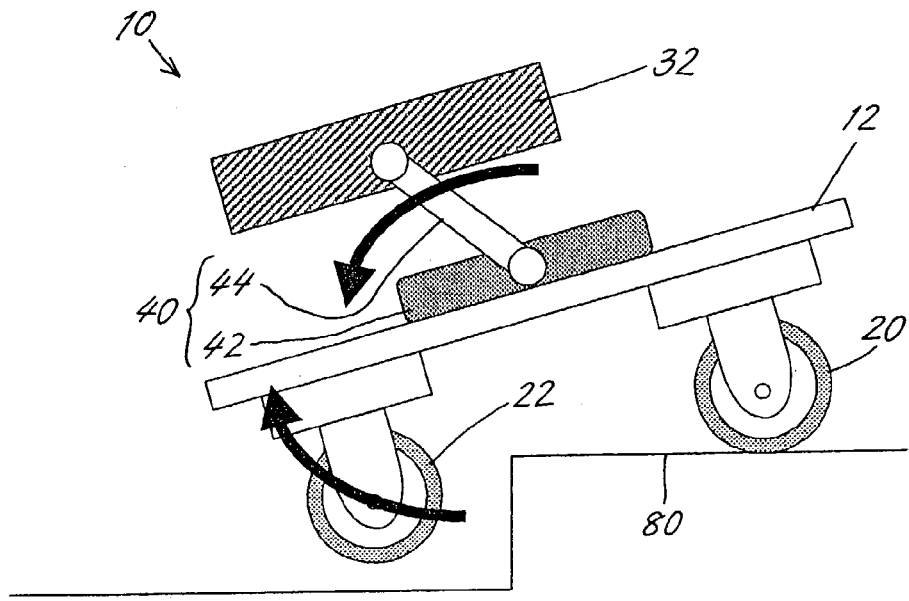
FIG. 20 is a side elevation showing the process for causing the mobile carriage of Embodiment 3 to move up onto the step.
Figure 21:
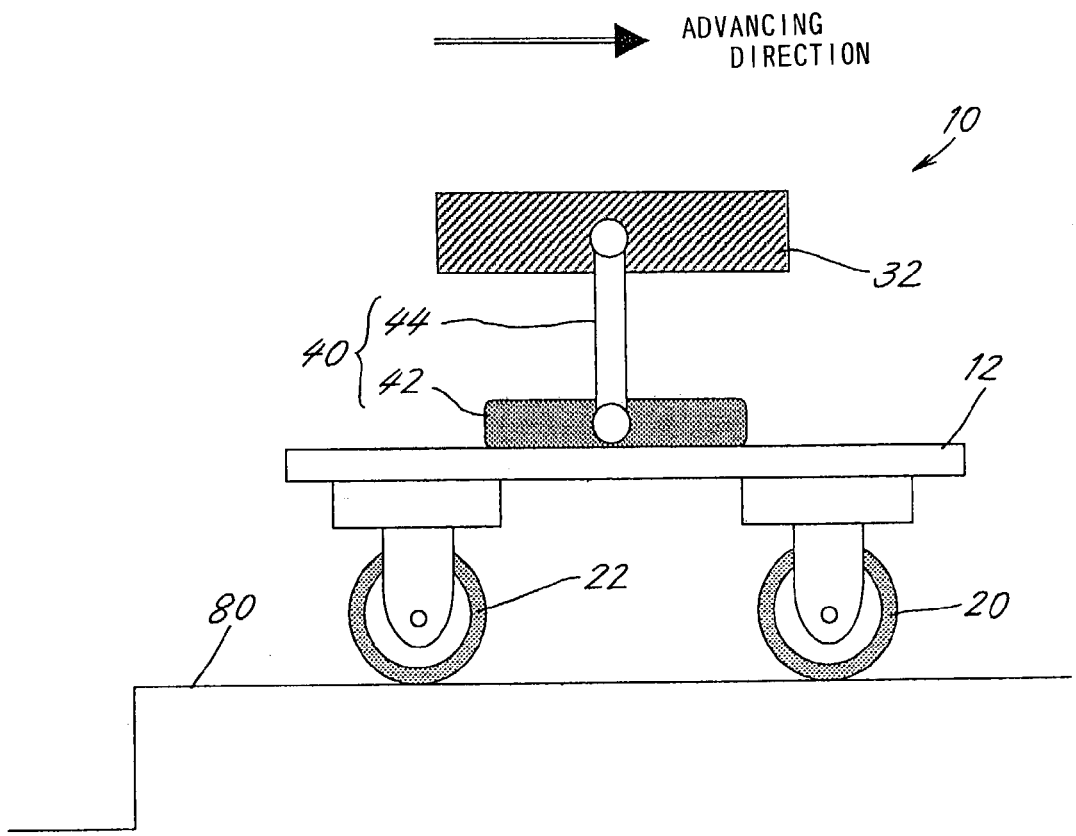
FIG. 21 is a side elevation showing the process for causing the mobile carriage of Embodiment 3 to move up onto the step.

With the front wheels 20 moved up onto the step 80, the weight portion 32 is conversely rearwardly moved or rotated at an accelerated rate as shown in FIG. 20. This reduces the weight acting on the rear wheels 22, and the rear wheels 22 are moved up onto the step 80 by the thrust of the front wheels 20 and the force of friction between the step 80 and the rear wheels 22. The carriage 10 is moved up onto the step 80 as seen in FIG. 21.

<Embodiment 4>

In running the carriage 10 on a slope, it is effective to shift the center of gravity of the carriage 10 as already described, whereas if the center of gravity is positioned outside the area surrounded by a phantom line connecting the four wheels 20, 22 one after another, there is the likelihood of the carriage falling down. Especially if the article to be carried and placed on the table is out of weight balance, the carriage is liable to fall down. Accordingly, there is a need to control the position of the center of gravity.

According to the present embodiment, therefore, each of wheels 20, 22 is provided with a load sensor 14 for detecting the load thereon, and the values of the respective sensors 14 are fed back to control the position of the center of gravity of the entire carriage 10.

The moving mechanism assembly for the weight portion can be one of those of the embodiments of the invention, while other moving mechanism is alternatively usable.

Figure 22:
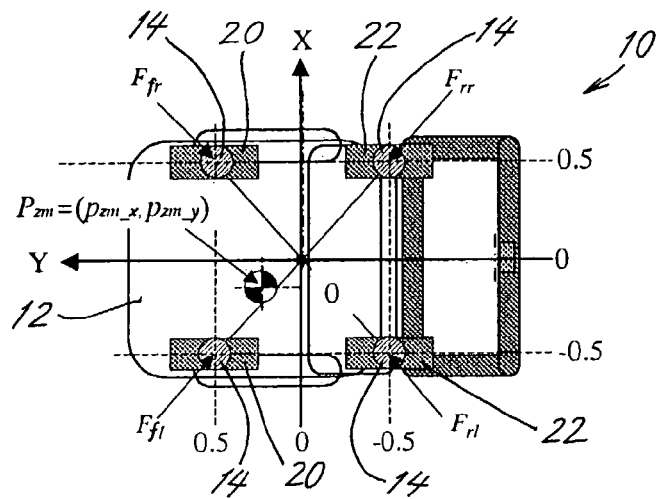
FIG. 22 is a diagram for illustrating a phantom coordinate system for use in measuring the position of the center of gravity of Embodiment 4.

Stated more specifically with reference to FIG. 22, each of the wheels 20, 22 is provided with a load sensor 14, the output value of which is detected. The output values of the respective load sensors 14 are substituted in the mathematical expressions given below, whereby the position of the center of gravity as projected on the plane of ground in contact with the wheels is detected in terms of proportions of the wheel-to-wheel distances.

With reference to FIG. 22, the center of the arrangement of four wheels 20, 22 of the carriage 10 (i.e., the center of the base frame 12) is taken as the center of a coordinate system wherein the Y-axis extends in the forward or rearward direction, the X-axis extends transversely of this direction, and the position of the center of gravity is $Pzm = (pzm\_x, pzm\_y)$. Represented as the output values of the load sensors 14 are Ffr for the front right wheel, Ffl for the front left wheel, Frr for the rear right wheel, and Frl for the rear left wheel. The detection range is ±0.5 in the transverse direction (X-axis direction) and ±0.5 in the front-rear direction (Y-axis direction).

$$Pzm\_x = (Ffr+Frr)/(Ffr+Ffl+Frr+Frl) - 0.5$$

$$Pzm\_y = (Ffr+Ffl)/(Ffr+Ffl+Frr+Frl) - 0.5$$

The position Pzm of the center of gravity of the carriage 10 can be readily calculated by substituting the output values of the load sensors 14 on the respective wheels 20, 22 in the above mathematical expressions for use in controlling the position of the center of gravity of the entire base frame, i.e., of the carriage 10.

<Embodiment 5>

With this embodiment, wheels 20, 22 are made movable relative to a base frame 12 to thereby shift the position of the center of gravity relative to the wheels 20, 22.

Figure 23C:
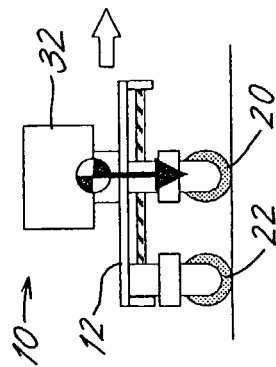
FIGS. 23A to 23C are side elevations of a mobile carriage of Embodiment 5.
Figure 23B:
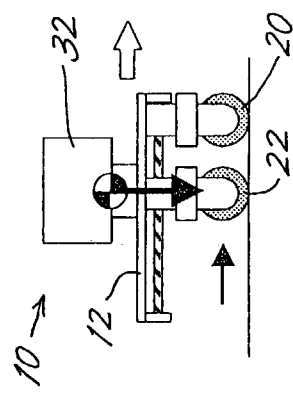
Figure 23A:
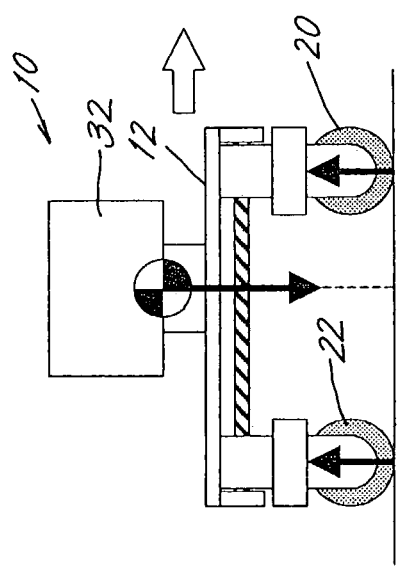

With reference to FIG. 23A, the base frame 12 is slidably provided with the wheels 20, 22 at front and rear portions thereof independently of each other, and a weight portion 32 is fixedly mounted on the base frame 12 approximately at the center thereof.

The position of the center of gravity can be shifted relative to the wheels 20, 22 by moving the rear wheels 22 forward or moving the front wheels 20 rearward as shown in FIG. 23B or 23C.

The mobile carriage 10 of Embodiment 5 is caused to move up onto a step 80 by the process to be described below.

When the front wheels 20 approach the step 80, the rear wheels 22 are moved forward as shown in FIG. 24A to shift the center of gravity (c.g.) toward the rear wheels. This reduces the weight acting on the front wheels 20, and the front wheels 20 are raised as shown in FIG. 24B by the thrust of the rear wheels 22 and the force of friction between the step 80 and the front wheels 20. The front wheels 20 are moved up onto the step 80 as shown in FIG. 24C.

When the front wheels 20 are moved up onto the step 80, the front wheels 20 and the rear wheels 22 are moved conversely rearward as shown in FIG. 24D to shift the center of gravity toward the front wheels. This reduces the weight acting on the rear wheels 22, and the rear wheels 22 are raised as shown in FIG. 24E by the thrust of the front wheels 20 and the force of friction between the step 80 and the rear wheels 22. The rear wheels 22 are moved up onto the step 80, and the carriage 10 is moved up onto the step 80 as shown in FIG. 24F.

Figure 25A:
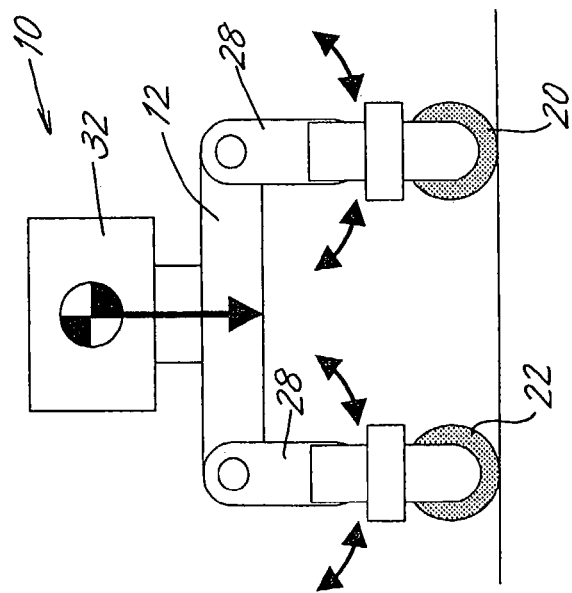
FIGS. 25A to 25C are side elevations of another mobile carriage of Embodiment 5.
Figure 25B:
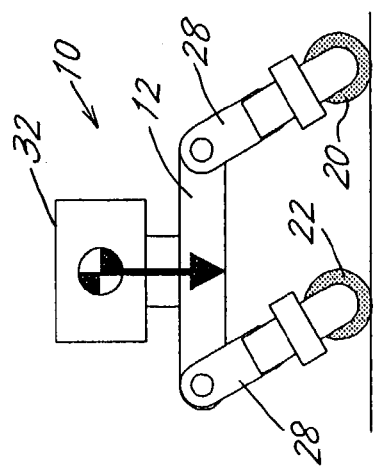
Figure 25C:
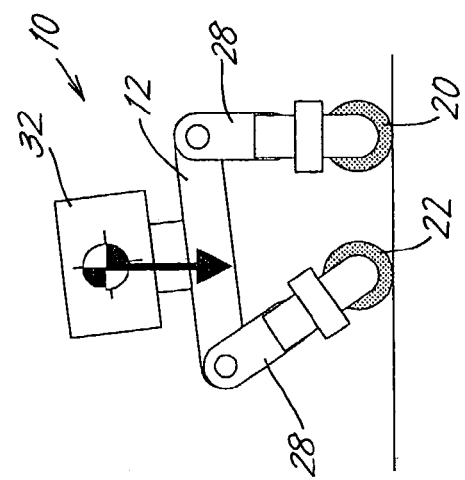

Incidentally, wheels 20, 22 may be provided on wheel mount portions 28, 28 pivotally movably supported by the base frame 12 as shown in FIG. 25A to FIG. 25C. In this case, the position of the center of gravity is shiftable relative to the wheels 20, 22 by pivotally moving the wheel mount portions 28, 28 relative to the base frame 12 as shown in FIGS. 25B and 25C.

<Embodiment 6>

Another embodiment of table 60 for placing thereon the article 62 to be carried will be described below.

Figure 26:
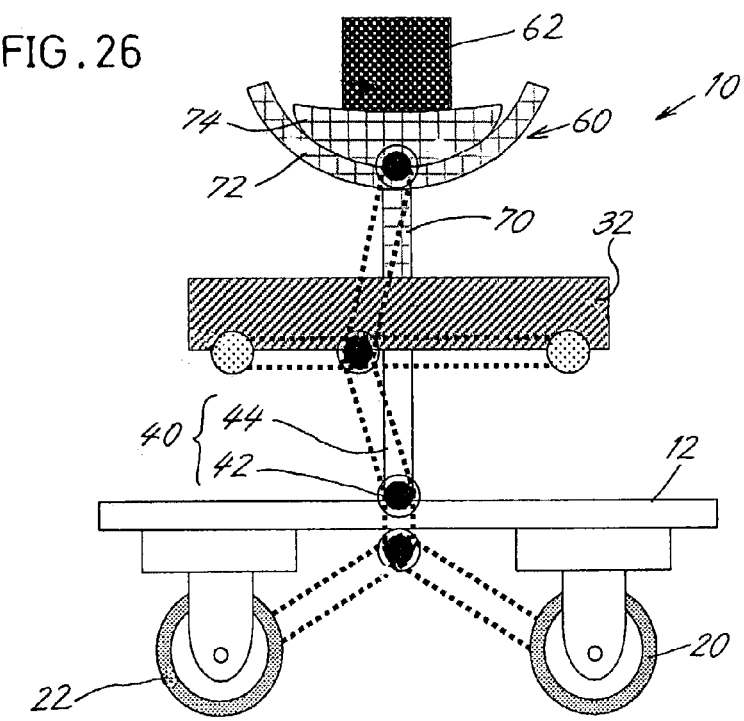
FIG. 26 is a side elevation of a mobile carriage of Embodiment 6.

FIG. 26 shows a mobile carriage 10 of this embodiment. Since the carriage is the same as the carriage 10 of Embodiment 2 except for the table 60, the same description will not be given again.

The table 60 comprises a support rod 70 extending upward from the weight portion 32, a concave horizontal support portion 72 attached to the upper end of the support rod 70, and a semispherical horizontal maintaining member 74 which is rockable along a concave inner surface of the horizontal support portion 72. The horizontal maintaining member 74 has an upper surface for placing thereon the article 62 to be carried. The member 74 is rockable relative to the support portion 72 by being driven by a gear (not shown) or the like.

Figure 27:
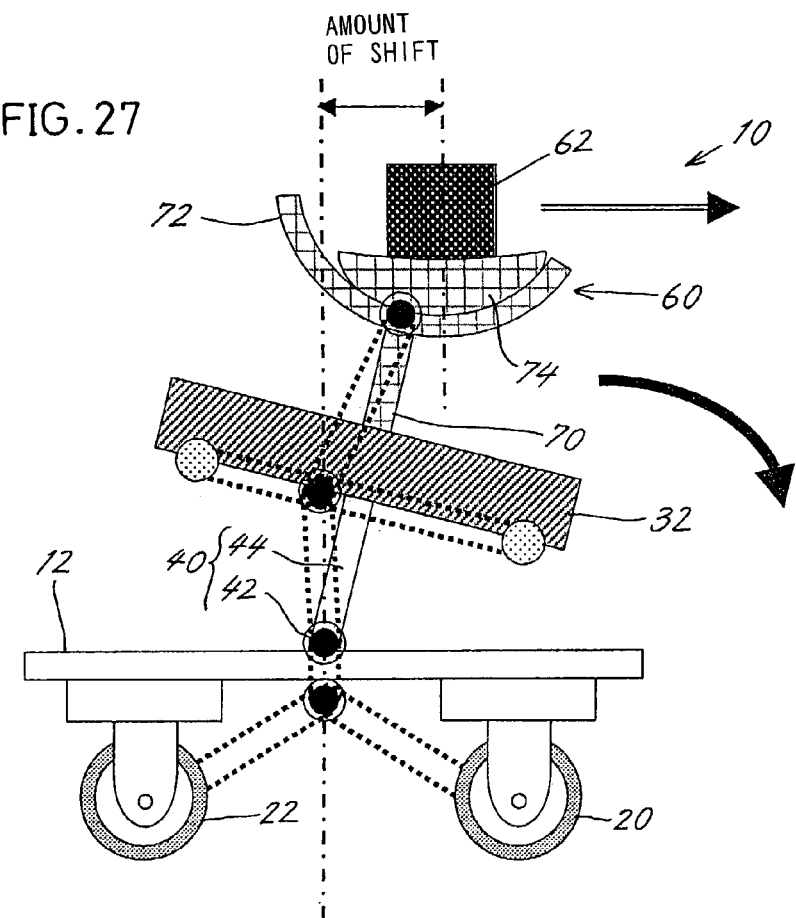
FIG. 27 is a side elevation of the mobile carriage of Embodiment 6 with a weight portion moved forward or rearward.

When the weight portion 32 of the mobile carriage 10 thus constructed is moved forward as shown in FIG. 27, the support rod 70 and the horizontal support portion 72 are inclined forward along with the weight portion 32, while moving the maintaining member 74 forward and rocking the member 74 so as to hold the upper surface thereof horizontal as this time. As a result, the article 62 to be carried is prevented from falling and slipping off, and the center of gravity can be shifted greatly since the center of gravity of the article 62 is also shifted forward.

The table 60 may be so adapted that the horizontal support portion 72 is pivotally movable relative to the support rod 70 as seen in FIG. 28, whereas a comparison between FIG. 27 and FIG. 28 indicates that when the weight portion 32 is inclined, the amount of shift of the center of gravity of the article 62 in the construction of FIG. 27 can be greater so that the center of gravity of the carriage 10 is shiftable more efficiently.

<Embodiment 7>

Next, a description will be given of a mobile carriage 10 which is adapted to raise front wheels 20 or rear wheels 22 for the carriage to move over a ditch 82, recess, difference in level or other obstacle.

FIGS. 29 to 32 are diagrams for illustrating a sequence of procedures for causing the present embodiment to move over the ditch 82. As shown in FIG. 29A, the carriage 10 comprises a rotating mechanism 42 provided on the upper side of a base frame 12 for tilting a weight portion 32 forward or rearward relative to the base frame 12, and a moving mechanism 40 provided at the upper end of a rod 49 connected to the rotating mechanism 42 for translating the weight portion 32 forward or rearward.

With the exception of the above feature, the embodiment has the same construction as Embodiment 1 or 2 and will not be described repeatedly.

The carriage 10 of Embodiment 7 is caused to move over the ditch by the process to be described below with reference to the drawings concerned.

Figure 29A:
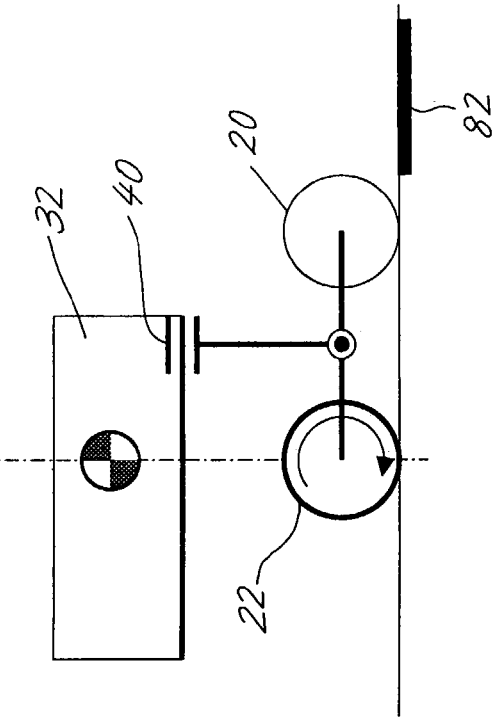
FIGS. 29A to 29D are diagrams for illustrating a process for causing a mobile carriage of Embodiment 7 to move over a ditch.

The carriage 10 is advanced in the state wherein the center of gravity thereof is approximately at the center (FIG. 29A shows a mark indicating the center of gravity), whereupon the presence of the ditch 82 ahead of the course is recognized by a sensor or the like. First, the carriage 10 is further advanced until the front wheels 20 reach an edge of the ditch 82 as shown in FIG. 29A.

Figure 29B:
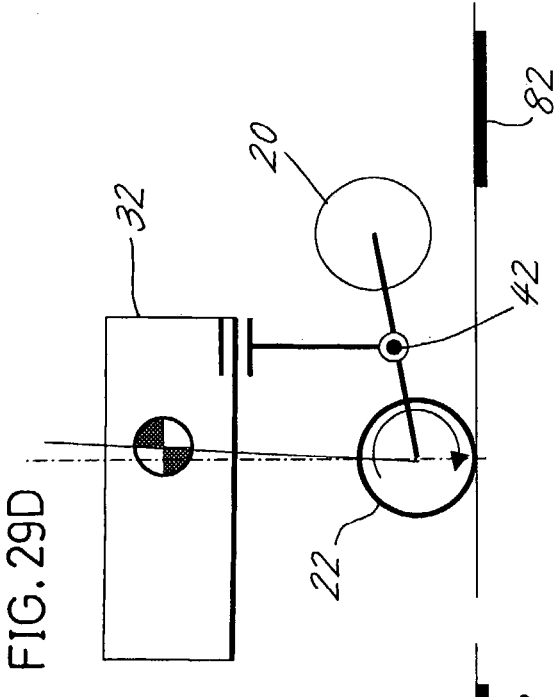
Figure 29C:
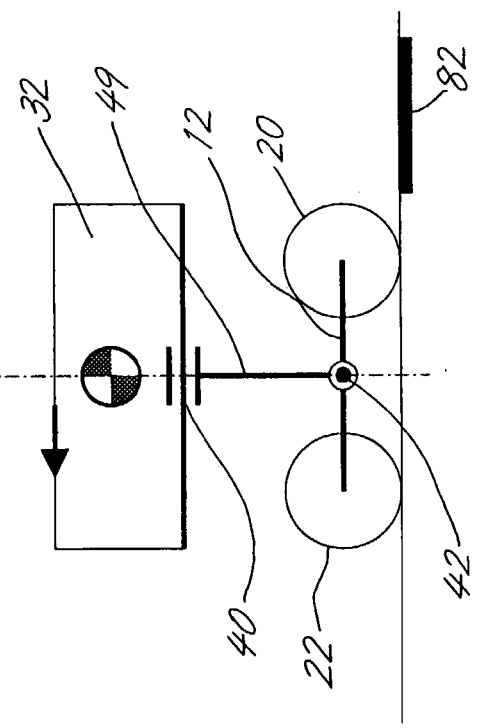
Figure 29D:
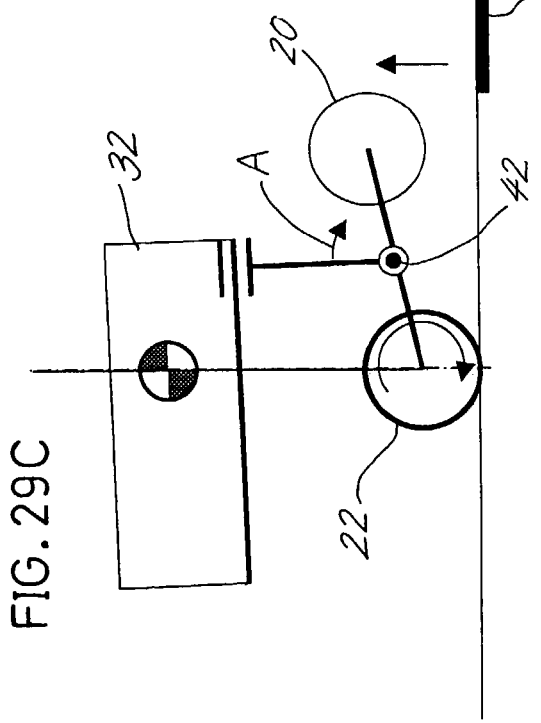

Next, the moving mechanism 40 is operated to move the weight portion 32 rearward to shift the center of gravity of the carriage 10 to above the rear wheels 22 as shown in FIG. 29B. When the rotating mechanism 42 is operated (as indicated by the arrow A in FIG. 29C) in this state to raise the front wheels 20 as shown in FIG. 29C, the front wheels 20 are lifted since the center of gravity is positioned above the rear wheels 22 (inversion control).

The rear wheels 22 are driven with the front wheels 20 held raised to advance the carriage 10 (rear wheel drive with inversion control). Even if the center of gravity of the carriage 10 somewhat shifts at this time (the state shown in FIG. 29D and FIG. 30A), inversion control effected permits the advance of the carriage with the front wheels raised. With the advance of the carriage 10, the wheels 20 as moved over the ditch 82 are detected, the rear wheels 22 as brought to the edge of the ditch 82 are detected, or the carriage 10 as advanced a specified distance is detected, whereupon the rotating mechanism 42 is operated reversely as indicated by an arrow A' in FIG. 30B to lower the front wheels 20 to the ground (FIG. 30C).

Figure 30B:
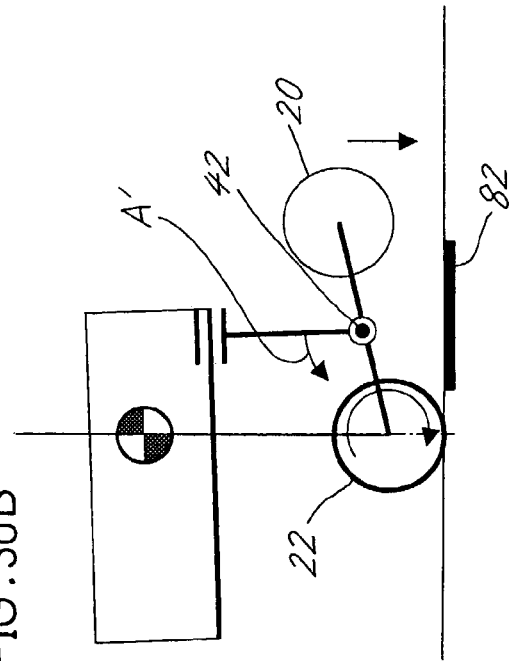
FIGS. 30A to 30D are diagrams for illustrating the process for causing the mobile carriage of Embodiment 7 to move over the ditch.
Figure 30D:
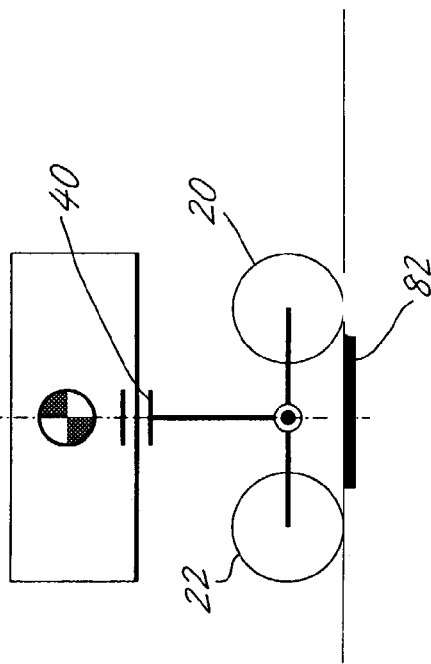
Figure 30A:
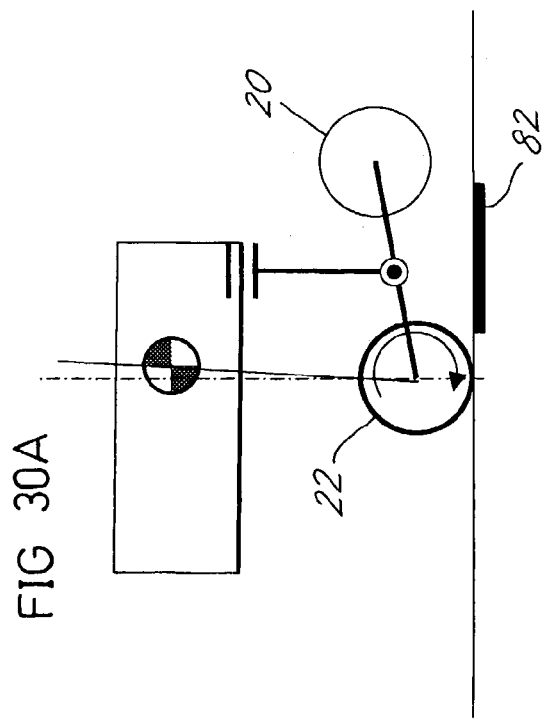
Figure 30C:
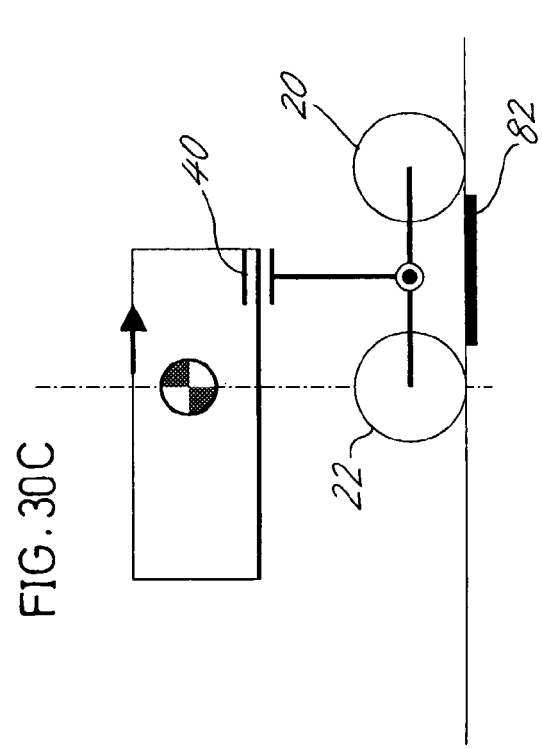

After the front wheels 20 have been placed on the ground, the moving mechanism 40 is operated as shown in FIG. 30C to move the weight portion 32 from the rear forward as shown in FIG. 30D, followed by the movement of the rear wheels 22 over the ditch.

Figure 31A:
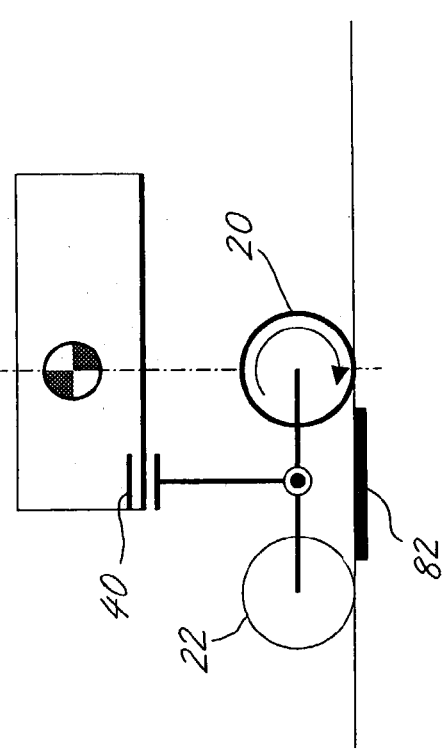
FIGS. 31A to 31D are diagrams for illustrating the process for causing the mobile carriage of Embodiment 7 to move over the ditch.
Figure 31B:
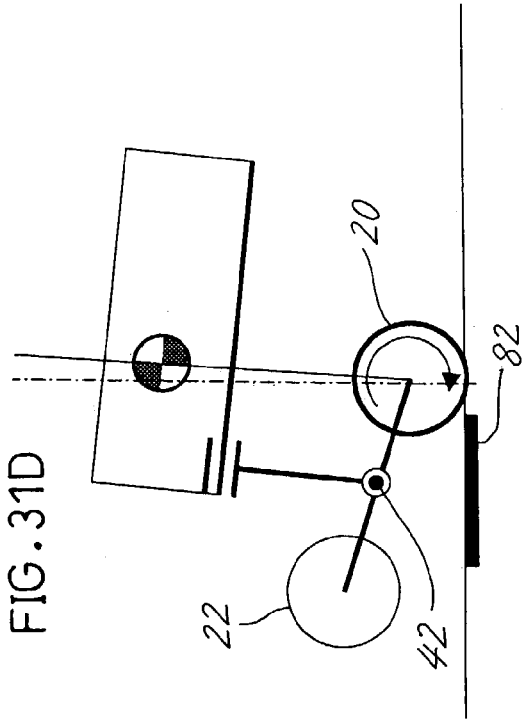
Figure 31C:
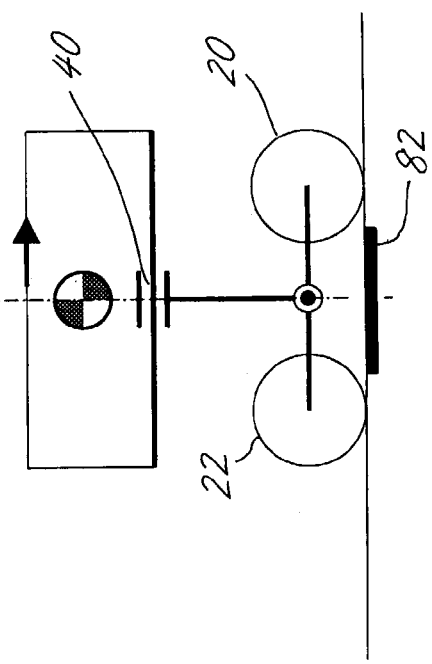
Figure 31D:
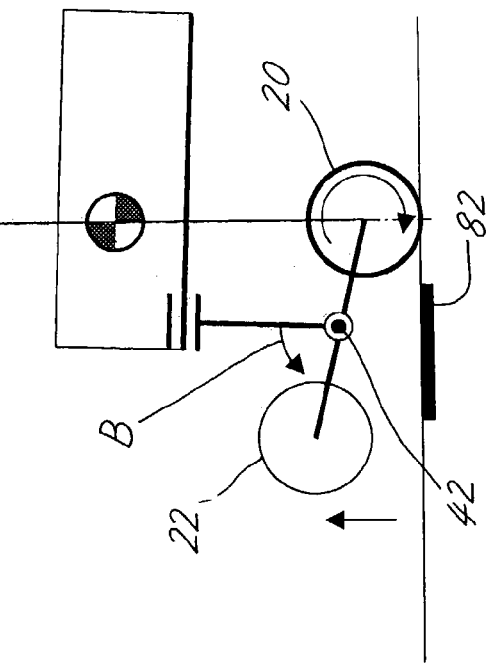

With the front wheels 20 placed on the ground, the weight portion 32 is moved forward as shown in FIG. 31A to shift the center of gravity to above the rear wheels 22 as shown in FIG. 31B. The rotating mechanism 42 is operated (as indicated by an arrow B in FIG. 31C) to raise the rear wheels 22 as shown in FIG. 31C. The rear wheels 22 are raised since the center of gravity is positioned above the front wheels 20 (inversion control).

The front wheels 20 are driven with the rear wheels 22 held raised to advance the carriage 10 (front wheel drive with inversion control). Even if the center of gravity of the carriage 10 somewhat shifts at this time (the state shown in FIG. 31D and FIG. 32A), inversion control effected permits the advance of the carriage with the rear wheels raised. With the advance of the carriage 10, the rear wheels 22 as moved over the ditch 82 are detected, or the carriage 10 as advanced a specified distance is detected, whereupon the rotating mechanism 42 is operated reversely as indicated by an arrow B' in FIG. 32B to lower the rear wheels 22 to the ground (FIG. 32C).

After the rear wheels 22 have been placed on the ground, the moving mechanism 40 is operated as shown in FIG. 32C to return the weight portion 32 as moved forward to the center of the carriage 10 as shown in FIG. 32D.

Consequently, the carriage 10 is moved over the ditch 82 and resumes the usual state of travel.

The carriage 10 is also capable of moving over a difference in level or other obstacle through the same procedures as above.

When the rear or front wheels 22 or 20 are rotated in contact with the ground, with the front wheels 20 or rear wheels 22 raised in the air by the inversion control described above, the carriage can be caused to run with the wheels so raised.

<Embodiment 8>

Embodiment 8 is adapted to move over a step 80 with front and rear wheels 20a, 20b, 22a, 22b raised one after another in this order.

Figure 33:
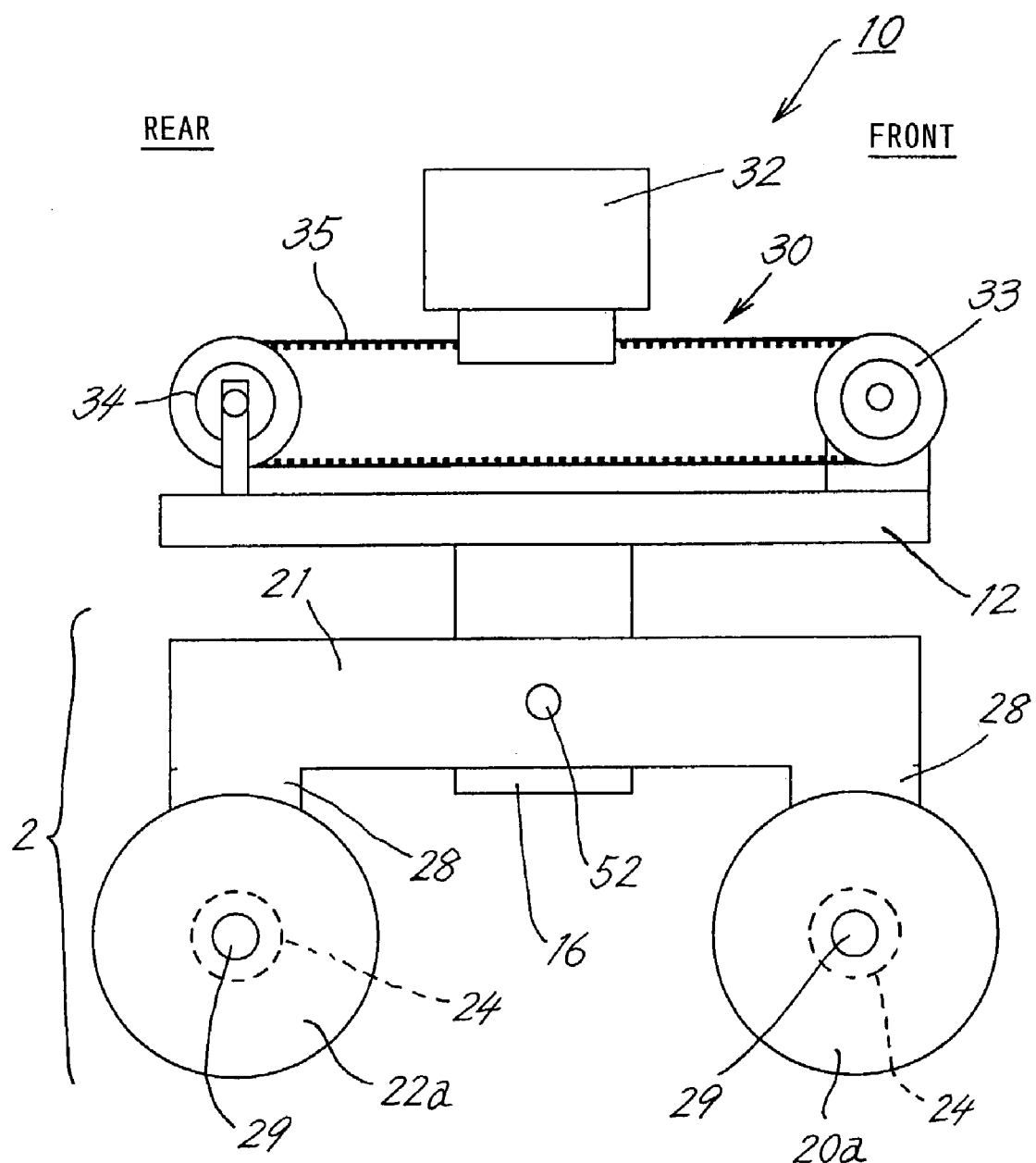
FIG. 33 is a side elevation of a mobile carriage of Embodiment 8.
Figure 34:
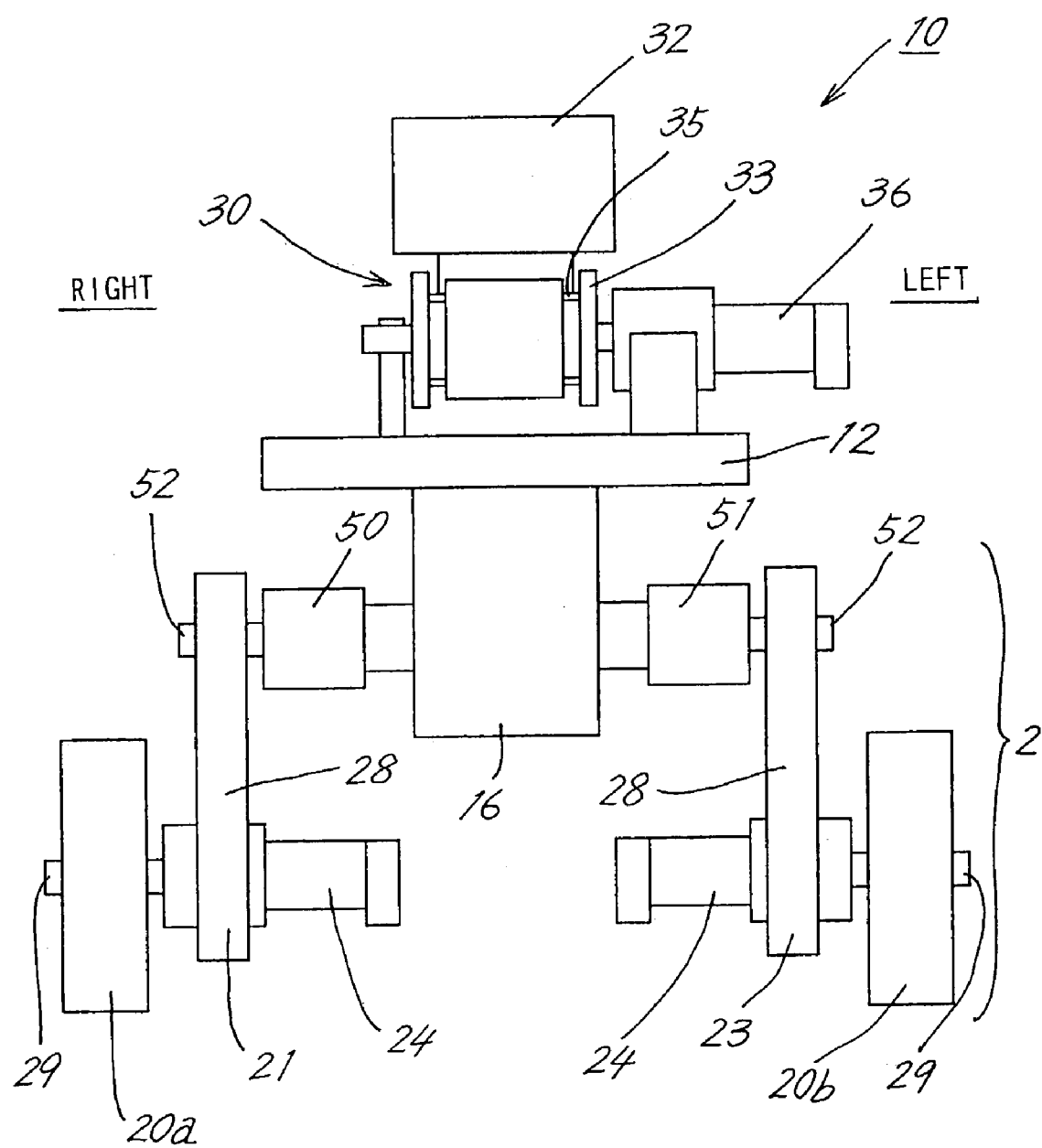
FIG. 34 is a front view of the mobile carriage of Embodiment 8.

FIG. 33 is a side elevation of a mobile carriage of the present embodiment, and FIG. 34 is a front view of the same. The "front," "rear," "right" and "left" directions with respect to the carriage 10 are shown in FIGS. 33 and 34.

The carriage 10 has a wheel mechanism 2 under a base frame 12 for running the carriage 10, and center-of-gravity shifting means 30 on the base frame 12. When required, the base frame 12 is provided with a table or the like for placing thereon a luggage, camera and like articles to be carried.

The base frame 12 has at a lower portion thereof a mount portion 16 for supporting the wheel mechanism 2 approximately at the midportion of the frame.

As shown in FIGS. 33 and 34, the wheel mechanism 2 has a pair of wheel support means 21, 23 respectively at opposite lateral sides, i.e., the right and left sides, of the carriage 1. Each wheel support means 21 (23) has a pair of wheels 20a, 22a (20b, 22b) in front of and in the rear thereof. The wheel support means 21, 23 are supported by respective pivotal drive means 50, 51 on the mount portion 16 so as to be pivotally movable relative to the base frame 12. The wheels 20a, 20b, 22a, 22b are rotatingly drivably supported by respective wheel rotating means 24, 24, 24, 24 on the wheel support means 21, 23.

Each wheel support means 21 (23) is in the form of a plate supported approximately at the midportion thereof by the pivotal drive means 50 (51) to be described below and is provided at opposite ends thereof with wheel mounts 28, 28 extending downward. The wheel support means 21, 23 are not limited to such a shape.

The pivotal drive means 50, 51 are provided on the mount portion 16 of the base frame 12 and each support the wheel support means 21 (23) pivotally movably in a plane perpendicular to the transverse direction, i.e., leftward or rightward direction, of the carriage 10. Each of the drive means 50, 51 is provided with a motor and a speed reduction mechanism coupled to the motor. The rotating shafts of the reduction mechanisms extend from the base frame 12 leftward and rightward to serve as pivots 52, 52 for the respective wheel support means 21, 23. The motors are rotatable independently of each other.

Figure 35:
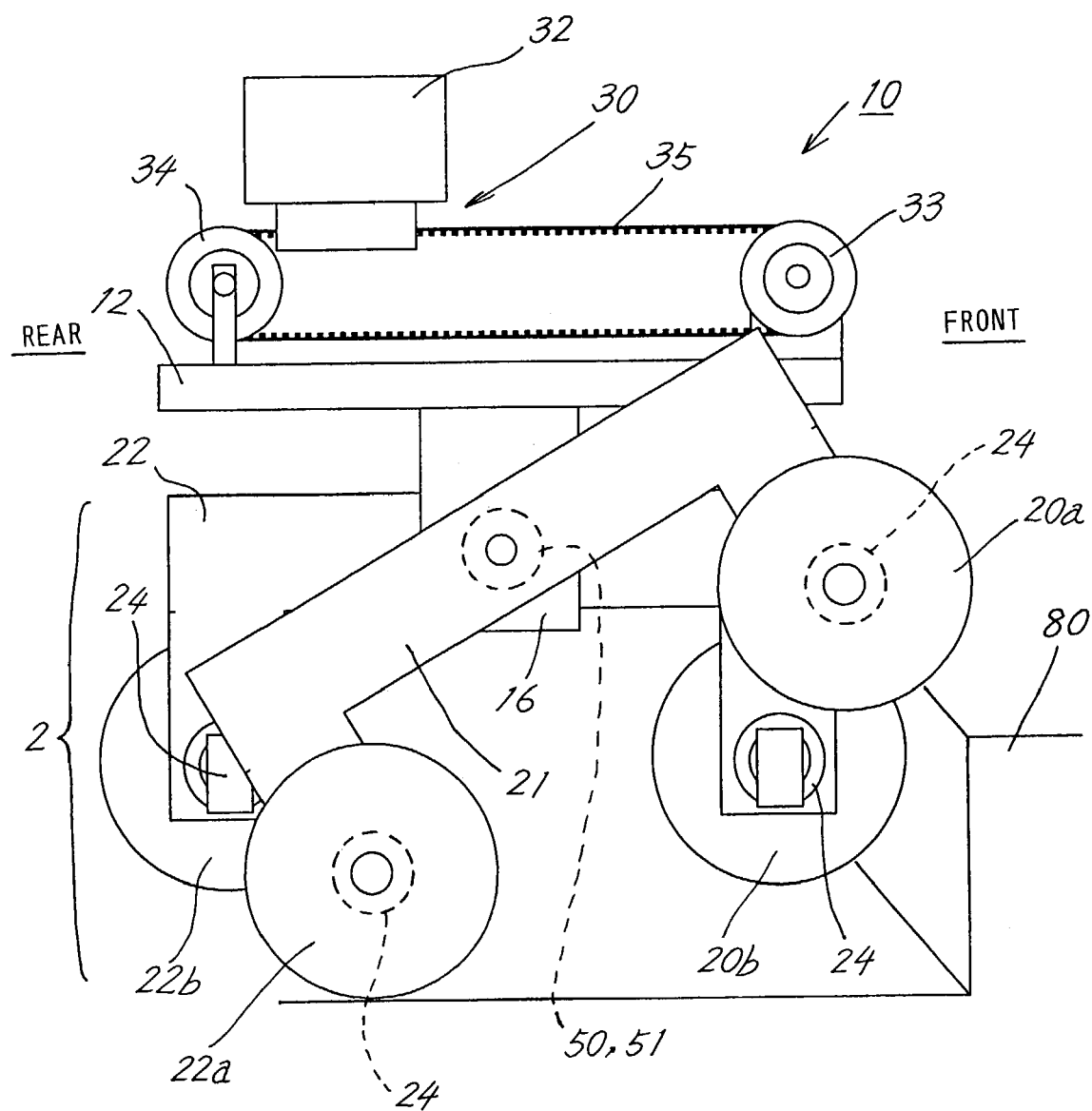
FIG. 35 is a diagram for illustrating the mobile carriage of Embodiment 8 with the front right wheel thereof raised and with a step shown in a perspective view for a better understanding of the position relationship between the wheels thereof.

The wheel support means 21, 23 pivotally move independently of each other in respective planes perpendicular to the transverse direction of the carriage 10 by driving the motors of the drive means 50, 51 as seen in FIG. 35.

By using a clutch mechanism, the wheel support means 21, 23 on opposite sides can each be pivotally moved independently of the other by a single motor.

Each of the wheel mounts 28, 28 of the wheel support means 21, 23 has inside thereof the wheel rotating means 24 for rotating the corresponding wheel 20a, 20b, 22a or 22b. The wheel rotating means 24 comprises a motor and a speed reduction mechanism coupled to the motor. The rotating shaft of the reduction mechanism extends outward from the wheel support means 21 or 23 to serve as an axle 29 for the wheel. The motors are rotatable independently of one another for rotating the respective wheels independently of one another when driven.

The wheels 20a, 20b, 22a, 22b are mounted on the respective axles 29, 29, 29, 29.

The base frame 12 of the carriage 10 is provided with the aforementioned center-of-gravity shifting means 30 for controlling the weight balance of the carriage 10.

The center-of-gravity shifting means 30 comprises a belt 35 reeved around pulleys 33, 34 supported on the base frame 12 at front and rear portions thereof, and a weight portion 32 providing the center of gravity and attached to the belt 35. One of the pulleys, 33, is coupled to belt driving means 36 having a motor as a drive source. The belt 35 is driven by the rotation of the motor to move the weight portion 32 forward or rearward between the pulleys 33, 34.

The center-of-gravity shifting means 30 is not limited to the above construction.

The wheel support means 21, 23, wheels 20a, 20b, 22a, 22b, or the base frame 12 is provided with infrared sensors or level difference detecting means (not shown), for example, for detecting a step 80 by detecting a variation in the load on a wheel upon the wheel coming into contact with the step 80.

The motors are controlled by control means provided on the carriage 10 or on an external manipulating means (not shown). The control means has stored therein a motor control program using motor control signals and detection signals from the level difference detecting means.

The carriage 10 has a power source which may be mounted on the carriage 10 for use as the weight portion 32 of the center-of-gravity shifting means 30, or which can be connected by a cord from outside.

The operation of the carriage 10 will be described below.

On flat roads, the carriage 10 can be advanced or retracted or turned leftward or rightward by driving the motors for the wheel rotating means 24, 24, 24, 24. The center-of-gravity shifting means 30 is so adjusted that the weight portion 32 is positioned approximately at the center of the carriage 10 at this time.

When the carriage is to be caused to move up or down a slope, the weight portion 32 of the center-of-gravity shifting means 30 is preferably moved toward the higher side of the slope from the center so that the carriage 10 will not fall down.

How the carriage is moved up onto the step will be described next with reference to a case wherein the front right wheel 20a comes into contact with the step 80 when the carriage 10 is advanced.

When the carriage 10 is moved, the level difference detecting means detects the front right wheel 20a of the carriage 10 as brought close to or as brought into contact with the step 80, whereupon the center-of-gravity shifting means 30 functions to move the weight portion 32 toward the rear portion of the carriage 10 and shift the center of gravity of the carriage 10 rearward. The pivotal drive means 50 on the right side is thereafter operated to pivotally move the wheel support means 21 on the right side so as to raise the front right wheel 20a as shown in FIG. 35.

The motors for the wheel rotating means 24, 24, 24, 24 are rotated for an advance with the front right wheel 20a in the raised position to move the front right wheel 20a to above the step 80.

Next, the wheel support means 21 on the right side is reversely pivotally moved to place the front right wheel 20a on the step 80.

When the carriage 10 is advanced in this state, the front right wheel 20a rolls along on the step 80, and the front left wheel 20b comes into contact with the step 80. The contact of the front left wheel 20b with the step 80 is detected by the level difference detecting means, whereupon the pivotal drive means 51 on the left side functions to pivotally move the wheel support means 23 on the left side and raise the front left wheel 20b.

The motors for the wheel rotating means 24, 24, 24, 24 are rotated for an advance with the front left wheel 20b in the raised position, whereby the front left wheel 20b is also moved above the step 80.

The wheel support means 23 on the left side is then reversely pivotally moved to bring down the front left wheel 20b onto the step 80.

Figure 36:
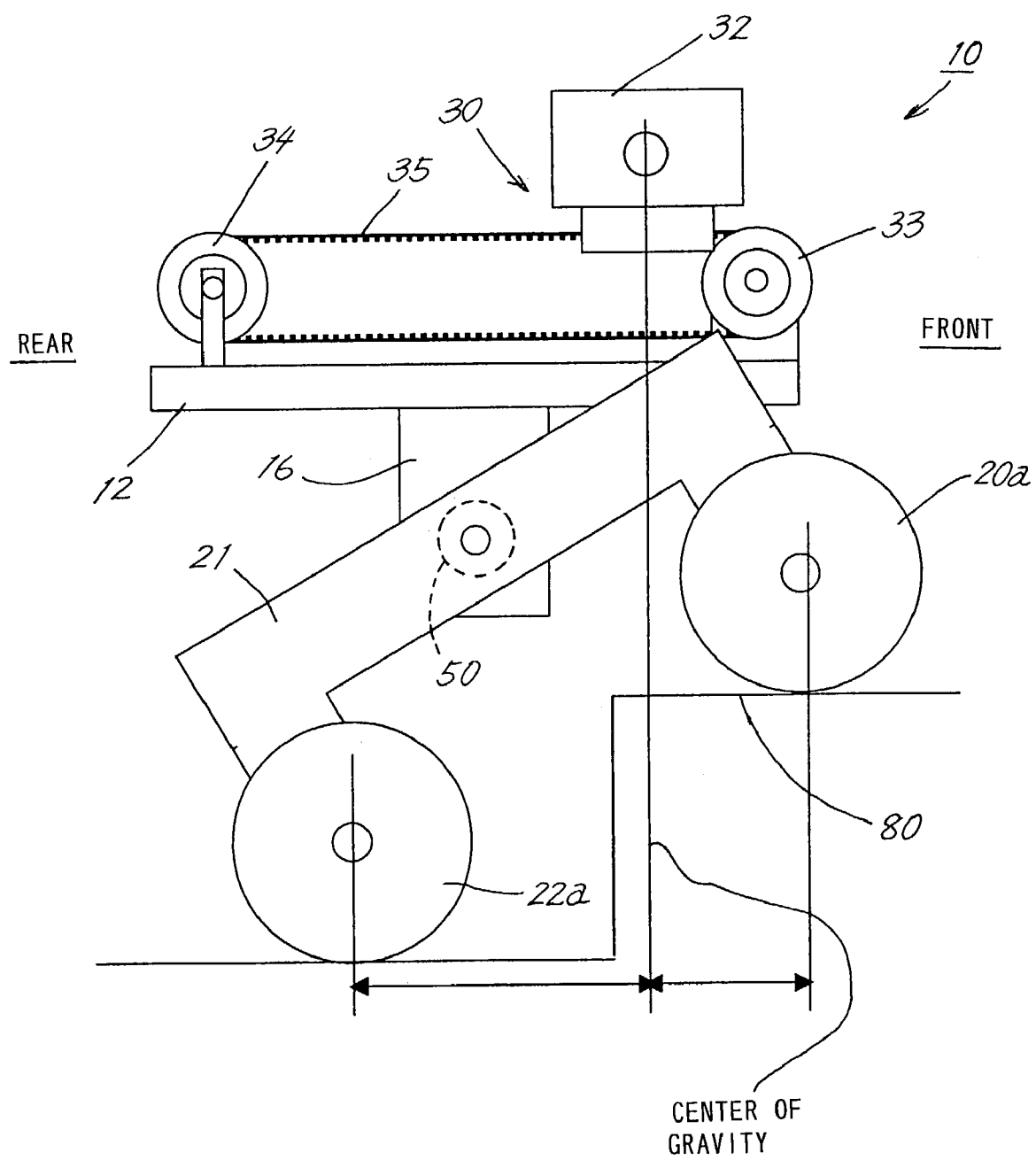
FIG. 36 is a side elevation showing the mobile carriage of Embodiment 8 with its front wheels moved up onto the step.

The center-of-gravity shifting means 30 is operated in this state to move the weight portion 32 toward the front of the carriage 10 as shown in FIG. 36, and the carriage 10 is further advanced, causing the front wheels 20a, 20b to roll along on the step 80.

Figure 37:
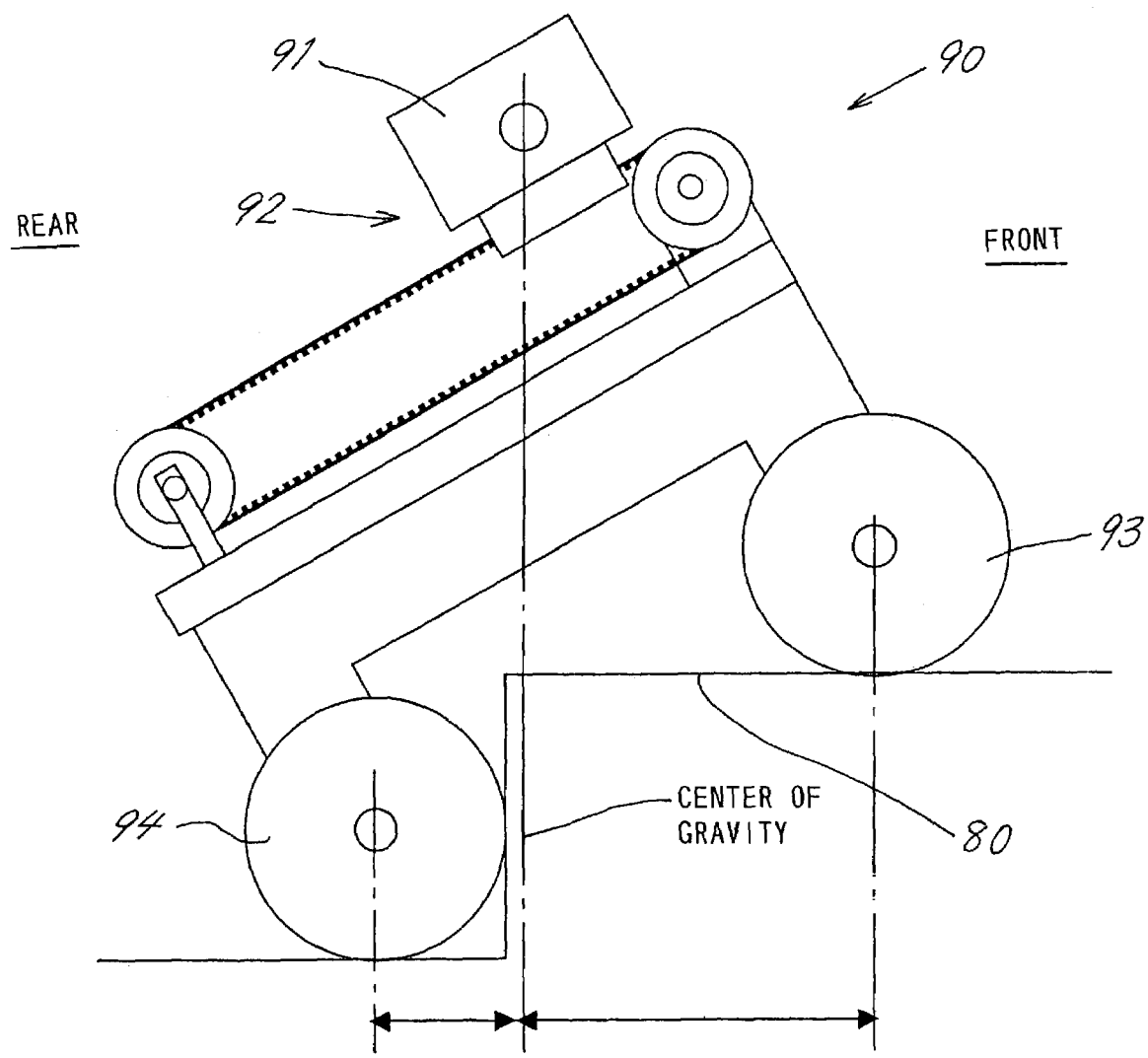
FIG. 37 is a side elevation of a conventional mobile carriage.

Since the weight portion 32 is moved toward the front portion of the carriage 10 by operating the center-of-gravity shifting means 30, the position of the center of gravity of the entire carriage as projected immediately therebelow is located as moved to a front portion of a phantom line interconnecting the respective positions of the center of the front wheel and the center of the rear wheel as projected immediately therebelow as shown in FIG. 36, and is unlikely to be located at a rear portion of the phantom line as in the prior art (see FIG. 37).

Accordingly, the weight acting on the rear wheels 22a, 22b can be smaller, permitting the rear wheels 22a, 22b to move up onto the step 80 smoothly for the carriage 10 to move onto the step 80.

It is desirable to operate the pivotal drive means 50, 51 with the movement of the rear wheels 22a, 22b onto the step 80 so as to prevent the inclination of the carriage 10.

After the carriage 10 is moved up onto the step 80, the center-of-gravity shifting means 30 is operated to return the weight portion 32 to the center of the carriage 10.

In this way, the carriage 10 can be moved up onto the step 80.

The carriage is controlled similarly in the case where the front left wheel 20b comes into contact with the step 80 first, or in the case where the rear wheels 22a, 22b are brought into contact with the step 80 first when the carriage 10 is moved rearward.

If the left and right wheels 20a, 20b come into contact with the step 80 at the same time, both the front wheels may be raised and moved up onto the step 80.

The description of the foregoing embodiments is intended to illustrate the present invention and should not be construed as limiting the invention set forth in the appended claims or reducing the scope of the invention. Further the carriage of the invention is not limited to the foregoing embodiments in construction but can be modified variously within the technical scope defined in the claims.

For example, the shape of the carriage, the shape of the wheel support means, the mechanism of the center-of-gravity shifting means, the number of wheels, etc. are not limited to those of the foregoing embodiments. For example, an auxiliary wheel or auxiliary wheels or the like may be arranged to give increased stability to the carriage.

Further the drive means and rotating means are not limited to those described above either. Although each of the wheels has wheel rotating means in the above embodiment, for example, the number of motors can be reduced by using belts and gears, or clutch mechanisms or the like; or motors can be provided on the base frame or on the center-of-gravity shifting means.

Apparently, one skilled in the art can modify or alter the present invention without departing from the spirit of the invention, and such modifications or alterations are included within the scope of the invention as set forth in the appended claims.

The invention claimed is:

1. A mobile carriage comprising:
    a base frame,
    a front wheel and a rear wheel disposed under the base frame,
    wheel rotating means coupled to the front wheel and the rear wheel for rotatingly driving the wheels,
    power source means for the wheel rotating means,
    center-of-gravity shifting means having a weight portion disposed above and moveable relative to the base frame and a mechanism for moving the weight portion relative to the base frame to shift the position of the center of gravity of the base frame by moving the weight portion by the mechanism for moving, said weight portion being connected to said base frame by at least one rod pivotably connected at one end to said base frame and pivotably connected at the other end to said weight portion,
    control means for controlling the wheel rotating means and the mechanism for moving, and
    at least one of the wheel rotating means, the power source means and the control means being utilized as the weight portion of the center-of-gravity shifting means.

2. The mobile carriage according to claim 1 wherein the moving mechanism moves the weight portion forward or rearward, and leftward or rightward relative to the base frame.

3. The mobile carriage according to claim 1 wherein the moving mechanism rotates the weight portion in a horizontal plane relative to the base frame.

4. The mobile carriage according to claim 1 wherein when the front wheel is to be moved over a difference in level, the moving mechanism operates to move the weight portion forward at an accelerated rate relative to the base frame, so as to cause the front wheel to move over the difference in level by an inertial force due to the movement of the weight portion.

5. The mobile carriage according to claim 1 wherein when the rear wheel is to be moved over a difference in level, the moving mechanism operates to move the weight portion rearward at an accelerated rate relative to the base frame, so as to cause the rear wheel to move over the difference in level by an inertial force due to the movement of the weight portion.

6. The mobile carriage according to claim 1 which comprises a load sensor for detecting the load acting on each of the wheels, and the moving mechanism controls the position of the center of gravity of the entire base frame based on the output value of the load sensor.

7. The mobile carriage according to claim 1 wherein each of the wheels is movable forward or rearward relative to the base frame, and the position of the center of gravity of the base frame is shifted by moving the wheel forward or rearward relative to the base frame.

8. The mobile carriage according to claim 1 which has a horizontal support portion for holding the weight portion horizontal, and the weight portion is coupled to the moving mechanism by the horizontal support portion.

9. The mobile carriage according to claim 1 wherein the weight portion is moved rearwardly of the base frame by the moving mechanism to raise the front wheel in the air and cause the front wheel to move over a ditch or a difference in level.

10. The mobile carriage according to claim 1 wherein the weight portion is moved forwardly of the base frame by the moving mechanism to raise the rear wheel in the air and cause the rear wheel to move over a ditch or a difference in level.

11. The mobile carriage according to claim 1 wherein when the front wheel is to be moved over a difference in level, the moving mechanism operates to rotate in a horizontal plane the weight portion forward at an accelerated rate relative to the base frame, so as to cause the front wheel to move over the difference in level by an inertial force due to the rotation of the weight portion.

12. The mobile carriage according to claim 1 wherein when the rear wheel is to be moved over a difference in level, the moving mechanism operates to rotate in a horizontal plane the weight portion rearward at an accelerated rate relative to the base frame, so as to cause the rear wheel to move over the difference in level by an inertial force due to the rotation rotation of the weight portion.

13. The mobile carriage according to claim 9 wherein the weight portion is returned to the position of the center of gravity of the entire base frame by the moving mechanism after the front wheel or the rear wheel is moved over the ditch or the difference in level.

14. The mobile carriage according to claim 10 wherein the weight portion is returned to the position of the center of gravity of the entire base frame by the moving mechanism after the front wheel or the rear wheel is moved over the ditch or the difference in level.

\* \* \* \* \*